(12) United States Patent
Ward

(10) Patent No.: US 12,015,444 B2
(45) Date of Patent: *Jun. 18, 2024

(54) SYSTEM, APPARATUS AND METHOD FOR TWO-WAY TRANSPORT OF DATA OVER A SINGLE FIBER STRAND

(71) Applicant: NOVEC Solutions, Inc., Manassas, VA (US)

(72) Inventor: Marvin W. Ward, Bristow, VA (US)

(73) Assignee: NOVEC Solutions, Inc.

( * ) Notice: Subject to any disclaimer, the term of this patent is extended or adjusted under 35 U.S.C. 154(b) by 546 days.

This patent is subject to a terminal disclaimer.

(21) Appl. No.: 17/367,531

(22) Filed: Jul. 5, 2021

(65) Prior Publication Data

US 2021/0336700 A1    Oct. 28, 2021
US 2022/0393765 A9    Dec. 8, 2022

Related U.S. Application Data

(63) Continuation-in-part of application No. 17/087,113, filed on Nov. 2, 2020, now Pat. No. 11,057,111.

(Continued)

(51) Int. Cl.
     *H04B 10/297*      (2013.01)

(52) U.S. Cl.
     CPC ................. *H04B 10/2972* (2013.01)

(58) Field of Classification Search
     CPC .. H04B 10/2972; H04B 10/2503; H04J 14/02
     See application file for complete search history.

(56) References Cited

U.S. PATENT DOCUMENTS 6,388,782 B1 * 5/2002 Stephens ............. H04J 14/0205
                                                     372/18
6,952,529 B1 * 10/2005 Mittal ............. H04B 10/07953
                                                     398/33

(Continued)

OTHER PUBLICATIONS

Jeong-Min Joo,"20-GB/s AMO OFDM Transmission Over 20-km Bidirectional Link by Separate I/Q Baseband Delivery Using Remotely Fed 1-GHz RSOAs," Jul. 25, 2012, Journal of Lightwave Technology, vol. 30, No. 16, Aug. 15, 2012,pp. 2661-2665.*

(Continued)

*Primary Examiner* — Omar S Ismail
(74) *Attorney, Agent, or Firm* — Raymond Van Dyke; Van Dyke Intellectual Property Law

(57) ABSTRACT

The systems, apparatuses and methods of the present invention set forth improvements to the problems of the current pairing or duplex paradigm, resulting in a dramatic increase in fiber transmission efficiency, accomplished explicitly by restructuring presently-aligned C-Band wavelengths into innovative DWDM transmit and receive formats, and through implementing photonic-wave changes, which directs Ethernet data flow onto new path adaptations. These improvements could reduce line haul expenses significantly, believed to reach a projected 50% less requirement/deployment of fiber strands. This saving would offer owner-operators substantial fiber strand cost reductions, affecting transportation rates of high-bandwidth digital payloads traversing over DWDM networks, and lower usage rates of cross-connections amid multiple equipment inter-exchanging throughout large data centers.

20 Claims, 11 Drawing Sheets

Related U.S. Application Data which is a continuation of application No. 16/672,954, filed on Nov. 4, 2019, now Pat. No. 10,826,611, which is a continuation of application No. 15/843,048, filed on Dec. 15, 2017, now Pat. No. 10,469,169, which is a continuation of application No. 15/209,572, filed on Jul. 13, 2016, now Pat. No. 9,847,838.

(60) Provisional application No. 62/191,570, filed on Jul. 13, 2015.

(56) References Cited

U.S. PATENT DOCUMENTS

| | | | | |
|---|---|---|---|---|
| 9,847,838 | B2* | 12/2017 | Ward | H04B 10/2972 |
| 2003/0012485 | A1* | 1/2003 | Neeley | H04L 49/40 |
| | | | | 385/24 |
| 2005/0025488 | A1* | 2/2005 | Wang | H04J 14/021 |
| | | | | 398/83 |
| 2006/0245687 | A1* | 11/2006 | Gall | H04B 10/272 |
| | | | | 385/24 |
| 2006/0245688 | A1* | 11/2006 | Gall | H04B 10/272 |
| | | | | 385/24 |
| 2010/0226655 | A1* | 9/2010 | Kim | H01S 5/02325 |
| | | | | 398/139 |
| 2012/0269515 | A1* | 10/2012 | Cvijetic | H04B 10/61 |
| | | | | 398/72 |
| 2014/0079401 | A1* | 3/2014 | Lee | H04J 14/02 |
| | | | | 398/81 |
| 2014/0308041 | A1* | 10/2014 | Grobe | H04B 10/2939 |
| | | | | 398/92 |
| 2015/0341116 | A1* | 11/2015 | Olsson | H04B 10/2543 |
| | | | | 398/28 |
| 2016/0226581 | A1* | 8/2016 | Jiang | H04B 10/801 |

OTHER PUBLICATIONS

Nathan Farrington,"Helios: A Hybrid Electrical/Optical Switch Architecture for Modular Data Centers," Aug. 30, 2010,SIGCOMM '10: Proceedings of the ACM SIGCOMM 2010 conference,pp. 339-345.*

Liang B. Du,"Long-Reach Wavelength-Routed TWDM PON: Technology and Deployment," Feb. 21, 2019,Journal of Lightwave Technology, vol. 37, No. 3, Feb. 1, 2019,pp. 688-692.*

* cited by examiner

SYSTEM, APPARATUS AND METHOD FOR TWO-WAY TRANSPORT OF DATA OVER A SINGLE FIBER STRAND

CROSS-REFERENCE TO PRIOR APPLICATIONS

This application is a continuation-in-part of U.S. patent application Ser. No. 17/087,113, filed Nov. 2, 2020, now U.S. Pat. No. 11,057,111, issued Jul. 6, 2021; a continuation of U.S. patent application Ser. No. 16/672,954, filed Nov. 4, 2019, now U.S. Pat. No. 10,826,611, issued Nov. 3, 2020; a continuation of U.S. patent application Ser. No. 15/843,048, filed Dec. 15, 2017, now U.S. Pat. No. 10,469,169, issued Nov. 5, 2019; a continuation of U.S. patent application Ser. No. 15/209,572, filed Jul. 13, 2016, now U.S. Pat. No. 9,847,838, issued Dec. 19, 2017; and claims the benefit of priority to U.S. Provisional Patent Application Ser. No. 62/191,570, filed Jul. 13, 2015, all entitled "SYSTEM, APPARATUS AND METHOD FOR TWO-WAY TRANSPORT OF DATA OVER A SINGLE FIBER STRAND," the disclosures of which are incorporated herein by reference.

FIELD OF THE INVENTION

The present invention is directed to and makes improvements to optical Dense Wave Division Multiplex (DWDM) wavelength transmission and management systems, improvements, which significantly lower Ethernet, Internet Protocol (IP) transmission and data center interconnection costs. More generally, the present invention relates to an improved optical Dense Wave Division Multiplex (DWDM) communications system, device, apparatus and methodology, which employs a new one strand fiber and management system, for transmission and reception of full time operation of two-way data communications, including video, Voice-over-IP (VoIP) with voice, data and Internet payloads, all networked on a single fiber strand and at low to multi-gigabit and higher transmission rates.

BACKGROUND OF INVENTION

The transmission of data across fiber optic cables is known. However, all prior art systems, particularly those for high data transmission, have separate pathways to receive and transmit data so that the two streams do not intersect and interfere with one another. Enormous industries and standards have developed to service the needs of the United States and the world in this regard with countless thousands of miles of cable laid with pairs of fiber wire strands. The present invention sets forth alternatives to the existing telecommunications paradigm, offering considerable advantages and cost savings.

As set forth in detail hereinbelow, the various embodiments of the present invention leverage the communications industry's Institute of Electrical and Electronics Engineers/International Telecommunication Union (IEEE/ITU) standards for designing and operating Dense Wave Division Multiplex (DWDM) systems over fiber optic cables dedicated for transporting Ethernet and Internet Protocol (IP) signals in medium to very large gigabit sized payload bandwidths. With regard to the prior art, the overall worldwide communications industry has achieved, during a very short time, considerable improvements in expanding optical link growth to meet incredible demands of multi-gigabit Ethernet transported bandwidths over multitudes of outside plant constructions projects, using fiber optic cable structures encapsulated with bundles of paired glass fiber strands. Fiber cable deployments have dramatically increased in ever-greater numbers, adding higher capacities of fiber strands spanning across the Continental United States and the populated territories of virtually every technologically advanced nation.

As is known in the art, fiber cable deployments are generally implemented using combinations of one or two methods, either through construction of aerial attachments onto utility poles or through direct cable burials along public and private land right-of-ways below earth level with implementations completed for large projects being constructed mostly within densely populated areas. Principally, fiber cables may be made of small, medium or very large bundles of glass fibers, called fiber strands, covered over by a tough outer protective non-metallic plastic layer called the fiber cable sheath. Inside, each individual fiber strand is arranged within a standard color order of identifiable groups of fibers placed into protective buffer tubes placed into strict coded separation. During installation, fiber strands are fused end to end along the fiber route under construction, making physical connections using a joint method called splicing or bonding of strand ends of fibers to extend cable span distances. As discussed, in general practice in the communications industry, fibers selected for applications in communications networks are grouped into two fiber strands called fiber pairs for transporting content in full two-way DWDM communications called fiber payloads via the aforementioned pairing or duplex paradigm.

Additionally, higher quantities of fiber deployments are completed in the U.S. within higher growth regions of metropolitan expanses, with cross-country long haul cable networks linking together large regional areas throughout the U.S. territories. Un-lit fiber strands having no equipment attachments are known as "Dark Fiber" strands or spare unassigned strands, whereas lit fiber strands may comprise light-wave laser equipment, entitled the aforementioned Dense Wave Division Multiplex or DWDM. As is understood, DWDM equipment is typically provisioned to power one fiber strand, using a single laser or multiples of laser generated light sources aligned in specific wavelength order applied by means of photonic laser powered sources with each being transmitted down individual strands of fiber. One or multiples of laser light waves are input into the end of one fiber stand and output the far end opposite fiber strand having traveled long distances, such as approximately eighty kilometers, i.e., the span of light driven distance. It is generally understood that laser-generated light sources offer greater fiber length opportunities, where considerable operating distances may be achieved using laser sourced light wave in form of optical light booster amplifiers called optical repeaters applied on longer fiber routes known as fiber spans. As is understood in the art, these optical gain devices require payload signal breakout access to the fiber pair strand at a physical location point of presence (POP) in order to regenerate the lightwave signal or reach the ultimate user, such as a consumer.

High bandwidth communications links of today's networks are established from two identifiable ends of a fiber link, usually within the communications company POP-provided operating premise and a far end opposite destination location where a customer is served. Typical names for the client's end (for identity purposes) are designated in the industry as "A" Communications Company premise, and a "Z" premise, or Client Premise Equipment (CPE) or far end location or client's POP. Thus, a transmission fiber link may span from A to Z.

In considering the historical fiber background of several years of fiber deployments, the communications industry has long conformed with a worldwide and significant IEEE and International Telecommunication Union (ITU) DWDM networking standard structured by selected standards body of knowledgeable staff persons being engaged with highly-experienced communications operating companies, manufacturers, engineering firms and consultants who all together, derive and maintain IEEE and ITU system specifications. The IEEE and ITU Standards are known worldwide for their industry posture of ground rules and generally followed for deployment, while abiding by strict open architectures of applicable standards for networking photonic wavelength assignments transmitted over paired two-fiber strands transferring intelligent digital data end to end between two points, previously identified as the aforementioned "A and Z" designated premises.

In particular, these two-way data transmissions were most always deployed as one fiber strand per each direction of transmission, i.e., A to Z and Z to A assigned for transport services, as per the industry operational specifications. Communications manufacturers providing the equipment and network operators deploying and operating DWDM networks strictly adhere to the aforesaid IEEE and ITU standard practices of transmitting DWDM wavelengths along fiber paths, which distribute network intelligent data content such as internet, VoIP voice, data and which oftentimes includes convergence of video payloads of data transmitted and received using two fiber strands. One single fiber strand is thus assigned to transport data per each direction of transmission, each being independent DWDM assigned fiber strands transporting separate payloads transmitted either A to Z or Z to A forming separate POP directions. In this case, two distinct DWDM payloads would in most networks be assigned two fiber strands for networking Multi-Gigabit delivery type systems, the aforementioned pairing or duplex paradigm prevalent today.

There exist a few networks in local short haul transport point-to-point links, but the only lower bandwidth systems that have applied a one fiber strand system do this by means of assigning a different lambda operating wavelength at opposite ends for example, e.g., 1550 nanometers and 1310 nanometers, respectively. Thus, in this narrow fashion two wavelengths are transmitted in two directions of transmission usually for a single strand having 1.0 Gigabit/s or lower data rates of 100 Megabits per fiber strand in rural or local metropolitan distribution systems, all done on a short dedicated fiber.

In this single fiber strand system, however, many applied payload applications have a higher level of light wave complexity and contain individual micron-size Dense Wave Division Multiplexing (DWDM) signal wavelengths, which are generated at very precise lambda wavelength and bandwidth settings in order to properly operate, making the single fiber strand usage approach impossible. Accordingly, these systems usually use two fiber strands and only operate over short haul fiber links at data rates of 10 Gbits, 40 Gbits, 100 Gbits and 200 Gbits. These wavelengths are available in DWDM standard wavelength channels published under the aforementioned IEEE/ITU established Standards. Both are relatively similar published documents and standards, which specify that both transmit and receive DWDM data networks be transmitted and received on single mode fiber, be transmitted in full two-way directions using one fiber pair, and having one fiber strand per each transmission direction as previously stated. In other words, these systems, to operate properly and effectively, require two fiber strands for transmitting full two-way DWDM signals.

Applicant has found that all current manufacturers of DWDM equipment offer fiber interfaces that require the use of full two-way fibers and dual fiber attachments, as do the manufacturers of optical small form factor laser transmit and receive devices, called enhanced small form-factor pluggable (SFP$^+$) light wave transceiver modules. Considering the aforedescribed past historical background, the rather simple two-fiber strand paradigm of transmission has a long history of deployment throughout the worldwide communications industry, with various hardware devices integrating user payload data multiplexed onto laser generated light waves generally operated at lower speeds of 1.0 Gigabit or less fiber line rate. For example, these low data rates were deployed at much lower density fiber network line rates introduced among Metro Channels and Long Haul cross country DWDM networks.

In another example, during the earlier days of Sonnet deployments, formatted Time Division Multiplex (TDM) signals were used to transport Internet content and user Internet payload signals along worldwide DWDM backbone routes. These systems operated at much lower speed transporting bandwidths, which overlay the Sonnet formats from 1.0 megabits to 2.5 Gigabits with 10 Mbit/s being the maximum TDM (Sonnet) formats. These very low transport speeds are in sharp comparison to current available rates of 10 Gigabits, 40 Gigabits, 100 Gigabits and upwards to 400 Gigabits transmission rates available by today's Ethernet and IP Data rates over DWDM. These early low-to-medium speed data links were setup by assigning Ethernet packetized data bits onto Time Division Multiplex frames containing encoded data bits and placed upon a single mode fiber strand using single end point connections originating at a POP "A", location data packets directed to travel in two different directions along two fixed fiber photonic injected light wave signals onto fiber strands reaching out to a second distant end location identified as "Z" optical end or premise POP.

A few years ago, the networking of high speed signals were deployed on fiber cables transporting SONNET at standard Optical Carrier-48 (OC-48), and 2.5 Gigabit rates were thought of as being very high speed networks. These cables were made of physical fiber glass strands, forming a solid transmission span extending through a two-fiber-strand interface at both end points, data content arriving after interoperating across intra-site spans and sometimes through hardware repeater optical amplifiers for amplification of data bits maintained the use of two fiber strands, delivering full two-way "east to west" and "west to east" directional transport as two independent sources of intelligent data bit content. Light wave signals transporting a payload of data bits were inserted into the aforedescribed TDM frames to be exchanged from one end to another end point using pre-defined SONNET protocols controlling intelligent data formats. These formatted frames represented the convergence of video, digital voice, data bits and Internet placed into a SONNET format typically originated from a single "A" location premise located transmit lambda signal as transmit data bits output carried in transmitted to a distant designated "Z" located premise where the data bits were received as input signal by way of lambda signals input to each end receiver.

Fiber transmission of Ethernet framed data was considered a great advancement during this time period and this technology brought about much improvement over analog or the aforementioned Time Division Multiplexing (TDM) Sonnet transmission systems. For example, a T1 operated as a lower speed transport system, was the carrier type of choice, and most often deployed prior to the Ethernet using long haul standards advanced in earlier transmission trials. Also, fiber optics were introduced in Time Division Multiplexing systems using T1, Digital Signal 3 (DS3), OC-3, OC-12, OC-48 and finally OC-192 formats. Many of these systems remain operating worldwide today, and all known systems continue to employ the aforesaid two-fiber-strand means for transmission exchange of data.

As noted in this long history of the industry's continuous deployment of the two-fiber-strand standard across different technologies and new systems deployments for transmissions of earlier high speed data, these same two-fiber transport concepts or paradigms have remained constant over a long span of time, even when the costs of transport using two fibers remains expensive, i.e., costing twice that of a single strand application. Indeed, the two-fiber transport paradigms and methods have been in use over many years and remain the standard methodology for transport, even though the Standards Body for Ethernet upgrades have achieved higher digital transmission rates principally accomplished with DWDM formats advanced transport rates. Furthermore, the IEEE and ITU standards groups have not specified that a single fiber strand operation at these Ethernet higher bandwidths and transmission rates would be preferable. Since systems are under development that will soon reach terabit bandwidths, there is a strong need for new technologies, such as set forth in the present invention, to address these ever-increasing technological demands in a more cost-effective manner.

By way of further background, the assignment and use of photonic transport sources are governed by established industry standard formats applying encoded data bits and bytes in compliance with hierarchy signals which conform to established industry standards for the data transmission. These include combined formats of Digital Video Signals, Digital Voice (VoIP) signals with High Speed Data-delivering Internet signals converged into data-formatted packets and framed to Ethernet signal formats for Digital Data Transport and distributed Networks, delivering millions of intelligent data bits and bytes of digital data content, called triple play contents. Content Data in the form of digital data bits and bytes are transported or moved from one end point to another at very high data rate speeds, typically moved inside laser lighted fiber strands at high transport speeds of light transmitted in single fiber strands per fiber route direction with networking bandwidth capacities ranging in low rates and capacity from 100's to 1,000's of Megabits/s and backbone fiber line rates typically reaching 1.0 Gigabit/s and greater, and also reaching to 400 Gigabit/s bandwidths carrying higher DWDM channel counts for transport bandwidth capacity per each deployed light wave or lambda encoded signal and each being referenced in time measured rate.

However, user demands for higher bandwidths continue to increase, and economic resources to network even greater amounts of wideband data for distribution are being distributed among customer premises. Today's market can be characterized as large and growing in demand for even higher bandwidths and is driven by the advancement of Ethernet convergence of Video, Voice and Data services, especially streaming video content. The U.S. Government, State and Local Counties and Municipalities rely upon large capacity links. Many countries and cities across the world are under considerable stress from their constituents to support expansions of broadband networks to businesses and homes at equivalent bandwidths reaching Internet speeds provided in their workplace. Indeed, wideband services transporting Internet, Data, VoIP (voice) and Video have become a driving force for economic reasons in the United States (and elsewhere) as higher rate broadband delivery are being adopted and or targeted to replace the slower speed Internet delivery systems serving both homes and businesses. Demand for even higher bandwidths transported at multi-gigabit rates especially in Metropolitan and nearby surrounding countryside fiber networks will remain high for many years into the future, and will be driven by bandwidth verses costs per megabits delivery, where the increases of the consumer demands can only become greater over time.

In view of the substantial technological challenges to meet the societal demands and the current demands for fiber strand communications paradigm in existing thought, the present invention is directed to a solution that breaks the physical constraints of existing systems, offering an improved paradigm of operation. In particular, the employment of a one fiber strand transport, when deployed in fiber networks, will alleviate some of the aforesaid bottlenecks existing among many fiber routes, especially where fiber cable strand counts in metropolitan distribution routes are not linear in capacity and within many older fiber backbone routes.

In particular, by immediately improving the capacity of these datalinks by a potential 50% gain in transport capacities, without experiencing additional massive financial expenses of deploying new fiber cables, content distribution operators and fiber cable owners would welcome the advancement.

Objectives of the Invention

In view of the various bottlenecks and limitations of existing prior art technologies, it is an objective of the present invention to provide a new and improved optical transport with automated management system delivering at least a 50% costs savings over applying the more standard DWDM Ethernet/IP communications systems. Various additional and non-exclusive objectives of the present inventions are set forth hereinbelow. It should, of course, be understood that many other objectives are contemplated by the advances of the present invention, and discussed further hereinbelow.

It is, therefore, an object of the present invention to provide a managed optical telecommunications system that doubles the transport capacity over existing systems through employment of a single fiber strand for two-way metro and long haul data communications.

It is another object of the present invention to provide a managed DWDM optical wave system, with a reduced number of fiber strands required for multiplexing various high broadband payloads on the same optical transmission path and de-multiplexing various payloads over same single fiber strand along the signal transmission path.

It is yet another object of the present invention to provide a managed optical telecommunications system that effectively doubles the fiber transport capacity through application over a single fiber strand for delivery of data rates operating at 10 Gbit/s, 40 Gbit/s, 100 Gbit/s 400 Gbit/s and beyond.

It is still another object of the present invention to provide a simplified means of, separately and individually, optically inserting and dropping a portion of the optical payload in an optical transmission path using a single fiber transport system for full two-way networking.

It is a further object of the present invention to provide a DWDM networking system, which will provide no loss of wavelength spacing between DWDM channels, and without loss of usable optical bandwidth transported across the network using a single fiber strand.

It is another object of the present invention to provide an optical DWDM/Internet Protocol (IP) network, wherein the spacing between optical wavelength generators remains in compliance with standard DWDM published wavelengths, and integrated apart in one SFP+ encasement without interference and transmitting two separate DWDM wavelength signals having separate wavelength set apart to drive modulation of two separate DWDM Channels.

It is yet another object of the present invention to provide an optical DWDM/IP network, wherein the spacing between optical wavelength receivers remains the same or substantially the same as standard DWDM IEEE and ITU published wavelengths and integrated apart in one SFP+ encasement without interference, and receiving two separate DWDM wavelength signals each having separate wavelengths set apart to receive modulation of two separate DWDM Channels, and maintain their received signals apart as two separate payload signals.

It is still another object of the present invention to provide an optical DWDM/IP network, wherein the DWDM optical wavelength generators and optical DWDM receivers discussed above remain the same as standard DWDM IEEE/ITU published wavelengths and integrated within one SFP+ encasement, avoiding or minimizing the disadvantages of IEEE/ITU published two-fiber-strand systems discussed above with respect to various prior techniques and where optical paths, such as single optical fibers offering more utility than simply serving as dumb fiber links.

It is still another object of the present invention to offset or defer the need to install new cable facilities in fiber strand-depleted cable sections, where fiber capacity have been exhausted through oversubscribing strand assignments to other networks, being expanded in transport capacity by deployment of the improved systems of the present invention, which relieve span congestion by up to about 50% per each deployment.

It is further object of the present invention to provide employment of multiple and preferably economical transport of Ethernet Data formed to meet Dense Wave Division Multiplexing (DWDM) and more efficient data center cross-connects, allowing deployment of one fiber strand cross-connections, without need to convert metropolitan and long haul networks that can employ one strand of fiber for full two-way transmission of high speed and high bandwidth delivery being networked across data centers.

In addition to achieving improved economical carrier sources, further use of additional aspects of the instant invention are contemplated, including smart drop-insert configurations of DWDM payload networking, and extensions of long fiber deployments creating a methodology for transporting high speed data between points, identified as "A" end and "Z" end at a savings reaching fifty percent fiber use reduction over sections of high density existing in today's DWDM deployed networks.

Additionally, the present invention preferably provides elements employed to produce and operate different packaged forms of the below-described aggrandizing systems, including, but not limited to, fiber end terminals and long haul amplified lines and transport networks containing repeaters, fiber optic amplifiers and optical wavelength switches and Wireless Internet Service Providers (WISPs) wireless networks and radiofrequency (RF) microwave equipment and coherent transport network interfaces.

These and other objectives are met by systems, devices, apparatuses and methods that employ the improved paradigm of the present invention, which solves numerous problems posed by the existing pairing or duplex mode or paradigm of operation.

SUMMARY OF THE PRESENT INVENTION

There is an increasing need for techniques for increasing data throughput across existing telecommunications systems.

The demands for an improved technique echo across the entire worldwide communications industry for greater achievements of economical return on investments, and concerns lately over the availability of excess fiber capacity in the ground, especially for the transportation and interexchange of Ethernet payloads. This is especially the position for the higher data rate payloads moving over the world's high bandwidth systems driven by network owners who constantly face unsteady market competition. Owners and operators of wideband data networks are compelled to consider every reasonable means of reducing operating costs, including the requirement to maintain a high quality of service (QoS) network. Thus, making any significant cost reductions in line haul expenses would receive favorable market consideration, especially if fiber driven efficiency, which per the tools of the instant invention is obtainable by means of opting for change of DWDM technology using traditionally applied standard policies towards the restructuring of DWDM wavelengths.

The systems, apparatuses and methods of the present invention set forth improvements to the problems of the current pairing or duplex paradigm, resulting in a dramatic increase in fiber transmission efficiency, accomplished explicitly by restructuring presently-aligned C-Band wavelengths into innovative DWDM transmit and receive formats, and through implementing photonic-wave changes, which directs Ethernet data flow onto new path adaptations. These improvements could reduce line haul expenses significantly, believed to reach a projected 50% less requirement/deployment of fiber strands. This saving would offer owner-operators substantial fiber strand cost reductions, affecting transportation rates of high-bandwidth digital payloads traversing over DWDM networks, and lower usage rates of cross-connections amid multiple equipment interexchanging throughout large data centers.

BRIEF DESCRIPTION OF THE DRAWINGS

While this Specification concludes with claims particularly pointing out embodiments and distinctly claiming the subject matter that is regarded as forming the present invention, it is believed that the invention will be better understood from the following Description taken in conjunction with the accompanying Drawings, where like reference numerals designate like system signal flow and other mechanical elements, in which:

FIG. 7A more particularly illustrates an aggrandizer ROADM, in which the multiple wavelengths are routed into respective receivers and transmitters having differing wavelengths that do not mix and together when providing pre-boost and post-boost of light wave power and routing of wavelength paths onto a second aggrandizer one fiber path system transmitted towards the Z end transmission system, with components and further aspects thereof further described in FIGS. 7B and 7C;

FIG. 7B further illustrates representative A end embodiment view of the aggrandizer ROADM described in FIGURE A, showing another embodiment of the TOADM device, illustrating the selection and dropping of wavelengths in one direction;

FIG. 7C further illustrates representative A end embodiment view of the aggrandizer ROADM described in FIGURE A, showing a further embodiment of the TOADM shown in FIG. 7B, with the selection and addition of wavelengths for simultaneous and non-interfering transmission in the opposite direction over the same fiber strand;

DETAILED DESCRIPTION OF THE PRESENT INVENTION

Figure 1:
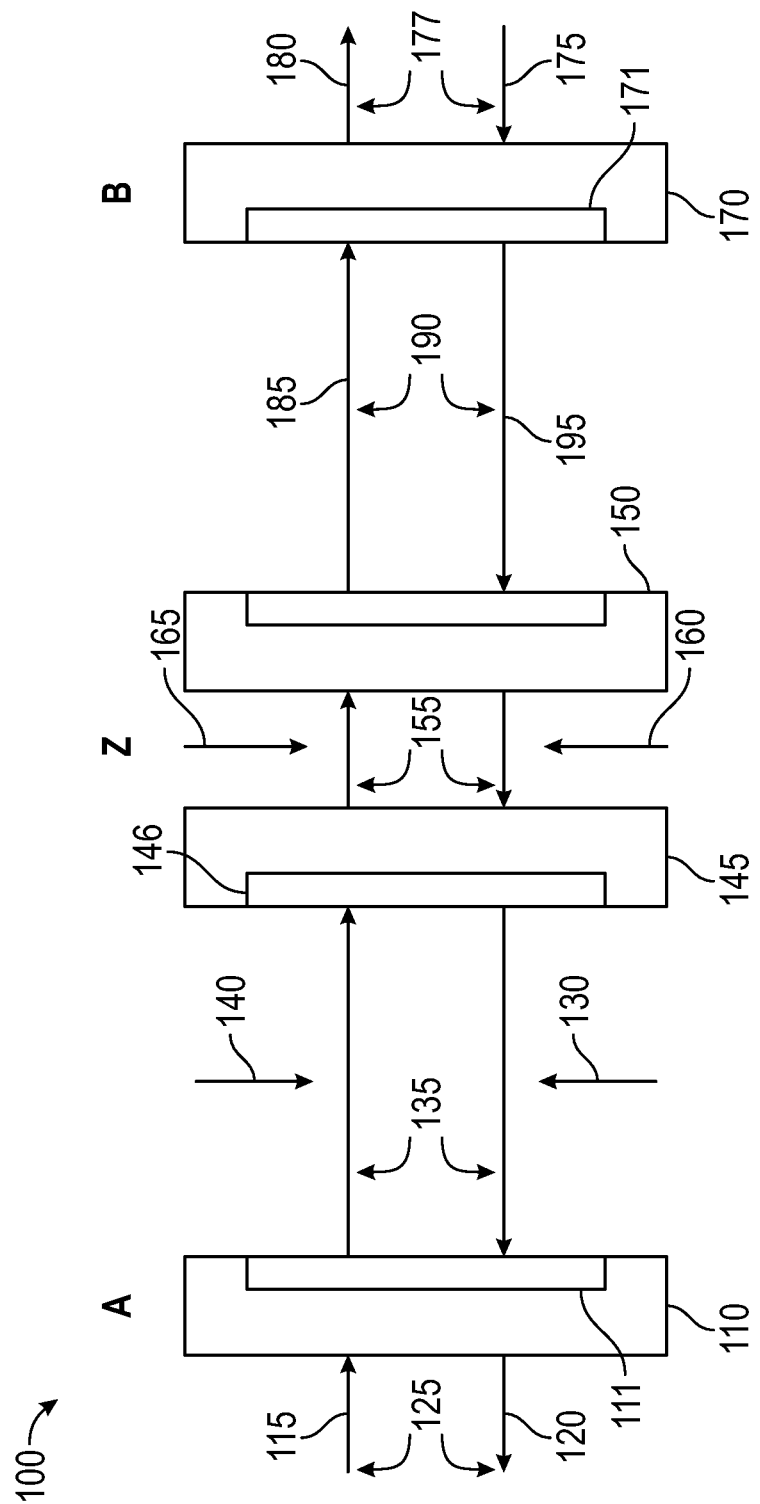
FIG. 1 shows a representative embodiment view of prior art configuration employing a two-fiber strand system operating on Sonnet Terminals end to end.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications provided herein are only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

As discussed, the present invention offers lower cost potential in construction and operation, which can relieve many bandwidth blockages and contribute to higher growth in fiber cables, and requires lower costs light wave equipment and optical changes to DWDM operated wavelengths along routes of existing long haul transport networks. It should be understood that the aggrandizer described in more detail hereinbelow can be implemented into existing and new DWDM-operated networks, DWDM network terminals, repeaters and photonic amplifiers and POP's, and can relieve many existing gridlocks and fulfill Internet content delivery operators and fiber cable owner demands for an economical means to expand broadband transport capacity. The present invention also adds new deployment opportunities to available DWDM Systems technology at much lower costs than constructing new fiber cables to achieve greater bandwidth requirements.

It should be understood that system enhancements employing a multi-gigabit aggrandizer network delivering yet again more broadband payloads of data in facilities over a single one fiber strand system instantly brings about advantages for network growth at much lower costs per kilometer of fiber transport. The industry overall and especially the aforementioned Wireless Internet Service Providers (WISPs) realize the high cost of transport as a major expense, affecting their business case analysis and restrictions towards meeting demands for broadband deployments. Even the higher costs of Gigabit and Terabit equipment purchases suffer the same cost limitations. The instant invention is also directed towards improvements for delivery of large data bandwidths that comply with the established industry standards yet, being able to reduce costs of fiber haul delivering triple play content. Oftentimes, the enhancements herein involve content transported over longer distances. Therefore, changing each existing two-fiber-strand system to the newly invented one-strand fiber transport application for local and long haul distributions has the potential to accelerate payback for even faster content delivery at lower costs per customer served. Indeed, eliminating only one strand of fiber in each large Gigabit system can bring about instant savings, and be capable of reducing line haul by nearly 50%, providing an instant gain in fiber operational proficiency and cost reduction of operating over existing leased fiber networks.

The instant invention makes reference to laser generated light wave power by several other types of applied Ethernet Switched Packet performing sources. The methods used for achieving this primary Single Fiber Strand Transport System is performed by integrating the aforementioned aggrandizer, more particularly a "One-Fiber Aggrandizer," set forth in more detail hereinbelow, into networks with Layers 2/3 and above Transmission Control Protocol (TCP)/IP switch applications. The instant application also takes advantage of the systems microcomputer control and fiber management driven systems, resulting in benefits of control and monitoring performances all the while, operating under existing strict network processor control management.

The system of the instant invention, therefore, combining content with existing network management, will make useful the harnessing of the instant Aggrandizer One-Fiber Strand Network using only a single strand of fiber for full two-way transport of photonic laser tuned wavelength energy.

As discussed in more detail hereinbelow, the present invention has the capability to form and manage multiples of one strand delivered wavelengths. This invention demonstrates uniquely a design having the effective means of controlling network variables of a so-called Aggrandizer Network Packet with tremendous savings for fiber line haul and fiber Cross-Connects, one of many advantages set forth in this patent application. With worldwide user acceptance and span usage breakthrough by applying the aforementioned Aggrandizer One-Fiber Network Packet technology, brings forth a new method of managing transmission and data center cross-connect interface for Multi-Gigabit Ethernet operations, being capable of networking two-way traffic over a single fiber strand using a photonic managed source per direction of signal flow, the instant invention will soon supplant the prior art.

As will be illustrated further hereinbelow, the present invention as defined herein can be implemented in many identifiable systems and new applications of the aforementioned DWDM IEEE/ITU protocol driven networks complying with the many protocol requirements where so-called Aggrandizer Packet Networks supplement the lower operating expenses for the small operator of deployed Gigabit Ethernet Transport networks.

It should be understood that a goal of the present invention is to achieve a global economic impact significantly upon global fiber line haul costs, and to offset these costs and dependence upon expensive fiber leased routes networking 10 Gbits to 100 Gbits speed circuits in Data Centers filled with multi-cross-connections networked into arrays of Cloud Computing Servers.

It is also a goal of the present invention that the Aggrandizer One Fiber Packet transport and cross-connection technologies and capability of the present invention, as described herein, when widely deployed, result in delivering highly-desired advantages economically, achieves a new form of global acceptance, and becomes an applied source for a new Aggrandizer Multi-Gigabit Transport IEEE/ITU standards body, benefiting many worldwide communication markets. The Aggrandizer One Strand Network of the instant invention described in more detail herein, will, in many cases, offset the need for deploying new fiber expansions by providing the communications operator a tremendous opportunity to use an electronic expansion deferment in place of new fiber deployments, avoiding the cost and inconvenience of digging up old cables.

To fully exploit the advantages of developing single fiber transport network technologies, it should be understood that the equipment and integral device components should be modular in design with parts commonality permitting ease of assembly and disassembly, thereby achieving additional gains and enable one-fiber-strand Multi-Gigabit Aggrandizer Packet Networks to compete with the present two fiber strand system that is commonalty found in use in today's networks.

Although the past and present IEEE-ITU Standard Dense Wave Division Multiplex Systems have been generally useful, it should be understood that they have serious disadvantages also and that those disadvantages often have compounding effects. For example, the transport carrying capacity of two fiber strands represent much more bandwidth than in some cases is needed in an early stage network, thereby causing a waste of fiber when two cable strands are not completely filled with data content, and adding unnecessary higher expenses applied to fiber per stand, and per customer per mile costs for the Enterprise Operator. Furthermore, with the single fiber application, as opposed to two fibers, the security of having two separate unlike lambda waves transporting content adds an extra level of security against tapping the payload content, as discussed further hereinbelow.

With reference now to FIG. 1 of the DRAWINGS, there is shown a prior art system employing the conventional two-way discrete pathways for incoming and outgoing data streams, generally designated by the reference numeral 100. As shown, this conventional and well-established technology uses two fiber strands between previously-defined fiber pair networks, one fiber strand being networked in point to point for transmit out on the A end and receiving input at the Z end of network, and another fiber being networked in point to point fashion for transport out the Z end and receiving input at the A end of the network. As illustrated, fiber pairs enter and exit a network in the system 100. It should be understood that both SONNET and Ethernet systems requires a second fiber strand to transmit from the Z end and receive at end equipment, thus requiring the additional one fiber strand or one fiber pair.

As discussed, many operating systems are in existence today where the content is multiplexed in time-division format and sent over combinations of a two strand fiber pair or over protective fiber rings requiring even more expense through use of the additional pair. These protective operating rings, however, are quite expensive when considering that some fiber ring lengths reach in excess of 100 miles distance. The additional expense, even when operating at 10 Gigabit rings, increase the costs of Internet distribution to a level much too expensive for the marketplace. The use of four fiber strands operating over an arranged ring topology produces many disadvantages, one of which to increase the minimum content to pay large monthly recurring costs (MRC). On the low-end, however, a typical 100 mile single fiber strand, should it be leased, could cost the Internet distribution operator an amount of $25.00 per mile×100 miles or $2,500.00 U.S. expense each month lease payment with twelve months of fiber rental charges equaling approximately $30,000 per year for one strand of fiber. Simply saving the costs of one fiber strand would thus save the operator $30,000.00 US Dollars per annual expense or a sum over a typical five year's lease for a $150,000.00 savings. The use of two fiber strands, using the example above, would cost an operator $60,000.00 annually.

Yet another disadvantage of the above prior art approach is that optical signals propagating through fiber-optic transmission lines undergo optical dispersion, i.e. the propagation velocity in optical fiber is a function of wavelength. Thus, adding more data in one light wave can cause broadening of the transmitted light pulses, as they propagate along the fiber in close space, as found in conventional DWDM. This further results in the broadening of the signal distortion, which leads to intersymbol interference (ISI), and an increase in bit-error rate (BER) and/or a reduction in usable transmission bandwidth, and a reduction of conventional DWDM lambdas at higher bandwidth lengths, as is understood to one of skill in the art. The amount of dispersion is a direct function of the optical path length and optical dispersion leads to reduced spacing between optical regenerators.

Another benefit of the aggrandizer of the present invention is that the spacing of transmit and receive channels are in separate wavelength bands, which eliminates the above interference caused by conventional large payload circuits assigned in adjacent channel spacing.

With the above in mind, with further reference to the conventional SONNET prior art system 100 in FIG. 1, a particular premise end, generally designated by the reference numeral 110, is shown, such as indicated above representing a terminal destination for the data, i.e., a consumer point for interface. The premise end 110 has two strand connections for the aforesaid consumer, i.e., an input strand, generally designated by the reference numeral 115, and an output strand, generally designated by the reference numeral 120. As discussed, the prior art fiber strands 115 and 120 together for a conventional fiber pair, generally designated by the reference numeral 125.

Also connected to the premise end 110 are another pair of fibers, generally designated by the reference numeral 135, comprising an input strand, generally designated by the reference numeral 130, and an output strand, generally designated by the reference numeral 140. It should be understood that incoming data on strand 140 may pass through the premise end 110 and on to the client input strand 115, where the client receives the data. It should be understood that the outgoing data from the client passes on to output strand 120, through said premise end 110, as discussed, and onto output fiber strand 140.

With reference again to FIG. 1, it should be understood that the data received from the premise A end along input strand 115 is received at the aforementioned SONNET terminal or premise A end 110. It should also be understood that in an exemplary embodiment of the present invention, the aforedescribed terminal 110 is an OC-192 SONNET terminal, which combines the aforesaid data signal with other input data signals, to make terminal 110 a 10 GBit laser sourced transmitter, with the so-combined data streaming out of the terminal 110 on said output fiber strand 140. At the end of the strand 140, the signals received pass through a DWDM multiplexer, generally designated by the reference numeral 146, at which point the Z premise end or SONNET terminal 145 combines the signal with other DWDM signals for further transmitting, e.g., across the strand 165 to the terminal 150, and receiving signals therefrom across strand 160.

Thus, on one path of the duplex communications, beginning input signals go across strand 115, enter terminal 110, which combines the signal with other signals, and transmits the resultant signal package to a terminal, generally designated by the reference numeral 145, across strand 140, e.g., at the aforesaid 10 GigaBit rate. The incoming signal package is passed through the multiplexer 146, and passed across the strand 165 to the other terminal 150. The relevant signal is then passed to terminal 170 across strand 185, e.g., at the 10 GigaBit rate, and forwarded across output strand 180 to back office equipment, e.g., through an interface.

With further reference to FIG. 1, the afore-sent data on strand 140 from the client is received at the other end of the strand 140, i.e., at a Z premise end or terminal 145, A SONNET terminal, as discussed hereinabove. Similarly, outputs from the Z premise end 145 on the strand 140, as discussed. Also shown in FIG. 1, is another Z premise end, generally designated by the reference numeral 150, which is also in paired communication with the aforesaid Z premise end 145, across another fiber strand, generally designated by the reference numeral 155, comprising an input strand, generally designated by the reference numeral 165.

As discussed, the aforesaid two-strand configuration 100 is typical of home and industry fiber connectivity. Also shown in FIG. 1 is another premise end, generally designated by the reference numeral 170, which, lie the premise end A, has a pair of fibers, generally designated by the reference numeral 177, including an input strand, generally designated by the reference numeral 175, which receives the client data input signals, and an output premise end B, generally designated by the reference numeral 180, where the client payload or signals enter, e.g., a cable television system.

Lastly, another pair of fiber strands, generally designated by the reference numeral 190, connect the premise end Z 150 and premise end B 170, an input strand, generally designated by the reference numeral 185, and an output strand, generally designated by the reference numeral 195. In this paired manner, virtually all conventional systems communicate.

Completing the full duplex path in reverse, i.e., Premise B through Z Premise and to A premise. requires a second fiber strand as follows: client data signal input 175 is multiplexed in OC-192 Sonnet terminal 170 at Premise B, preferably by a multiplexer, generally designated by the reference numeral 171, and is transmitted out as a DWDM signal being laser driven at 10 Gigabit rate, travels the fiber strand 195 to said terminal 150, preferably, a DWDM De-multiplexer, generally designated by the reference numeral 151, the aforementioned Z premise. The signal then passes across fiber 160 to said terminal 145, particularly said multiplexer 146, and onto said fiber strand 130, which makes up the outside plant fiber pair 135 at the aforementioned 10 GBit rate. There, the client payload data signal at the 10 Gbit rate is transmitted over fiber strand 130 to the A Premise end, particularly, OC-192 terminal 110, where the DWDM signal is de-multiplexed by a multiplexer, generally designated by the reference numeral 111, and the signal then output to back office equipment along strand 120.

This facility is also typical of applying two fiber strands arranged as two-way fibers strung across Metropolitan areas to distant locations typically designed with use of two fiber strands, one sending and receiving Z to A or in this facility, A to Z to B one fiber strand sending and receiving in the return path or opposite direction.

Figure 2A:
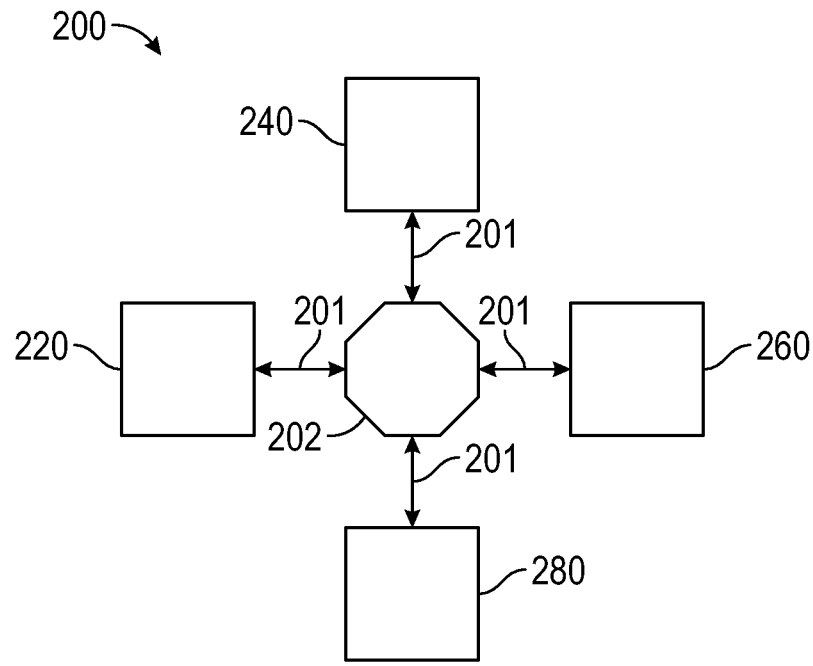
FIG. 2A illustrates, in schematic format, a Dense Wave Division Multiplex (DWDM) system with an aggrandizer internetworking with a reconfigurable optical add-drop multiplexer (ROADM), and a tunable optical add/drop module (TOADM), according to a first embodiment of the present invention, with components thereof further described in FIGS. 2B, 2C, 2D and 2E.

With reference now to FIG. 2A of the DRAWINGS, there is shown an exemplary system topology or configuration, generally designated by the reference numeral 200, which practices the principles of the present invention in a first embodiment thereof. It should, of course, be understood, however, that the principles of the present invention are applicable in a variety of system topologies and configurations. In particular, illustrated in FIG. 2 is a first aggrandizer reconfigurable optical add-drop multiplexer (ROADM) switch, generally designated by the reference numeral 202.

As shown in FIG. 2A, a number of component parts in the figure are described further in connection with FIGS. 2B, 2C, 2D and 2E as a convenience, each generally designated by the reference numerals. 220, 240, 260 and 280, respectively. In the representative topology 200 of FIG. 2A, the components in connection with reference numeral 220 are to the left of the Aggrandizer 202, the components in connection with reference numeral 240 are above the Aggrandizer 202, the components in connection with reference numeral 260 are to the right of the Aggrandizer 202, and the components in connection with reference numeral 280 below the Aggrandizer 202. It should thus be clearly understood that the present invention is a multi-connection device and not just a point to point device. Accordingly, additional backbone lengths can be connected to the Aggrandizer 202, as is understood in the art.

In general, the configuration 200 shown in FIG. 2A depicts a topology including DWDM signal C-band wavelength that connects by assigning optical protocols being arranged in a hub and spoke networking topology operating the Aggrandizer 202 at or near the fiber edge of the network with fiber path connections consisting of both long haul metropolitan fiber networks and other network interfacing layers 2-3 or more switches and routers supporting the wide array of Ethernet networking and applications, e.g., the aforementioned components 220, 240, 260 and 280. It should be understood that these fiber links and equipment include switches and routers operate ports in and ports out of the aggrandizer 202 hub located at the center of the aforesaid topology 200. Note that various Ethernet and IP data payloads transmitted by means of using photonic waves are indicated at each end of the aggrandizer 202 links or terminals, as single fiber strand ends, e.g., transporting 10 Gigabits. For illustration, eight high and eight low band wavelengths are utilized, and each wavelength may transport a different number of 10 Gigabit-size payload content up 100 to 200 Gigabits of payload capacity per each port operated, as is understood in the art.

Switches and routers illustrated will function in their conventional way using TCP/IP-Ethernet protocol operations. although special security features added will be presented in greater detail herein.

The Aggrandizer 202 offers greater future proofing of user networks by employing Finisar's new Flexgrid™ technology as an off the shelf product to merge into the new invented Aggrandizer's One Fiber Strand Transmission network. The Finisar Flexgrid™ features coherent optional designs providing the compatibility of Flexgrid™ and Aggrandizer thus, enhancing the Flexgrid™ operating and benefits of same 100 GHz channels as featured by the Aggrandizer One Fiber Strand patented designs.

The Aggrandizer 202 employs long haul and Metropolitan transmission and fiber cross-connections in Data Centers of reconfigurable circuit bandwidths under dynamic control and to allow add-drop of single and multiple channels of coherent modulated payloads that are compatible to the 50 GHz and 100 GHz channels featured in the Aggrandizer Single Fiber Strand design described in the instant patent application.

Figure 2B:
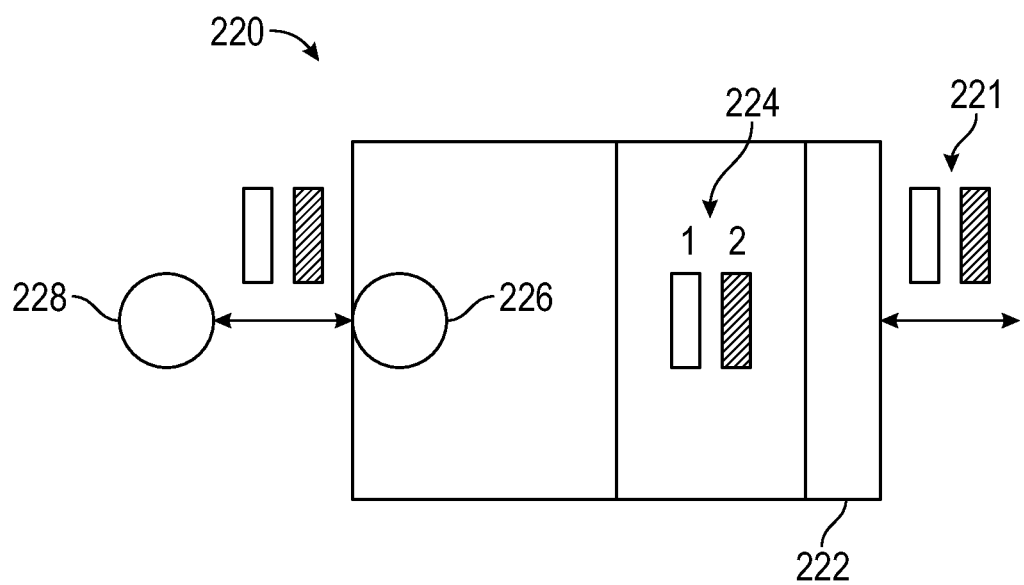
FIG. 2B illustrates, in schematic format, a component of the DWDM system described in FIG. 2A, including an aggrandizer terminal.

With reference to FIG. 2B of the DRAWINGS, there is shown an aggrandizer terminal and repeater, generally designated by the reference numeral 220, such as may be employed in connection with a 10 Gigabit/second repeater, accessing a high/low channel, generally designated by the reference numeral 221. As shown, the Aggrandizer 202 supplies 100 Gigabit/second capability to the terminal 220, but a Coarse Wavelength Division Multiplexer (CWDM), generally designated by the reference numeral 222, reduces the number of channels available in DWDM, and increasing them in the opposite direction. The terminal 220 also includes a high and low channel, as described and generally designated by the reference numeral 224, and a smart circulator, generally designated by the reference numeral 226. The smart circulator 226 communicates with another smart circulator, generally designated by the reference numeral 228, e.g., across the aforementioned high and low channel, at a terminal Z end and connected to the circulator 228.

Figure 2C:
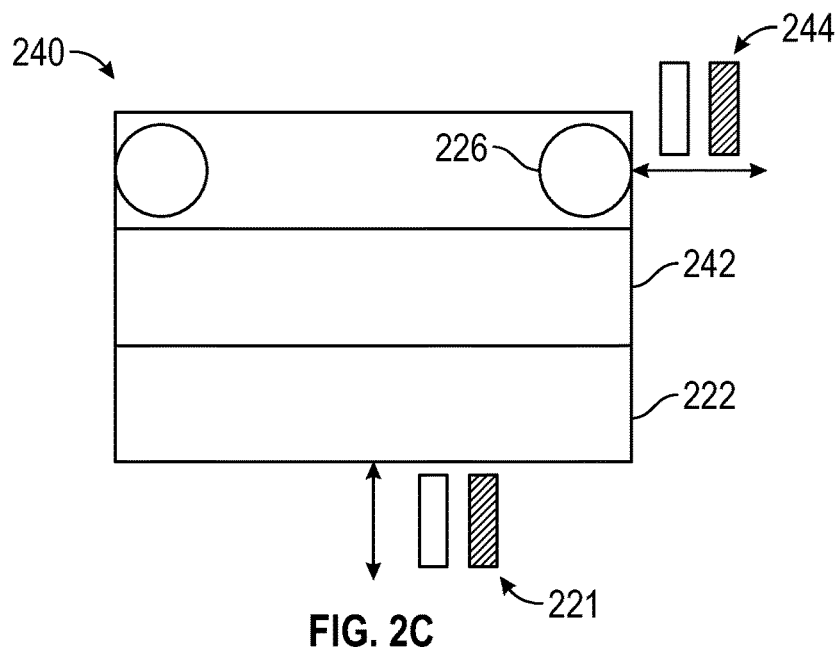
FIG. 2C illustrates, in schematic format, a component of the DWDM system described in FIG. 2A, including another aggrandizer terminal.

With reference to FIG. 2C of the DRAWINGS, there is shown another aggrandizer terminal and repeater, generally designated by the reference numeral 240, such as also may be employed in connection with a 100 Gigabit/second repeater, according to a high and low channel 221. As shown, the Aggrandizer 202 supplies the aforementioned 100 Gigabit/second capability to the terminal 240, but there is a CWDM 222. The terminal 240 also includes a DWDM multiplexer, generally designated by the reference numeral 242, which has high and low bandwidth capability, as described and as is understood in the art, and one or more circulators 226. As indicated, one circulator 226 can communicate with a terminal, such as an A or Z end terminal, across the high and low channels, as generally designated by the reference numeral 244.

Figure 2D:
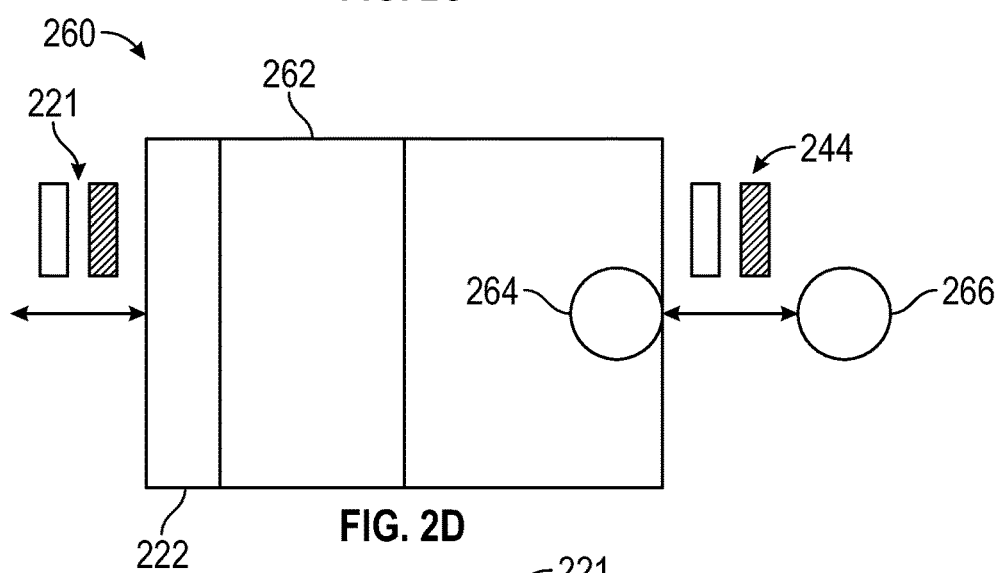
FIG. 2D illustrates, in schematic format, a component of the DWDM system described in FIG. 2A, including yet another aggrandizer terminal.

With reference to FIG. 2D of the DRAWINGS, there is shown another aggrandizer terminal and repeater, generally designated by the reference numeral 260, which may transmit up to 100 Gigabit/second repeater, according to a high and low channel 221. As shown, the Aggrandizer 202 supplies the aforementioned 100 Gigabit/second capability to the terminal 260, which also has a CWDM 222 and a DWDM multiplexer with high band and low band capabilities, generally designated by the reference numeral 262. Also, a smart circulator, generally designated by the reference numeral 264, communicates with an external circulator, generally designated by the reference numeral 262, as discussed hereinabove, across the high and low channels, generally designated by the reference numeral 244, and which connects with an end terminal, as discussed.

Figure 2E:
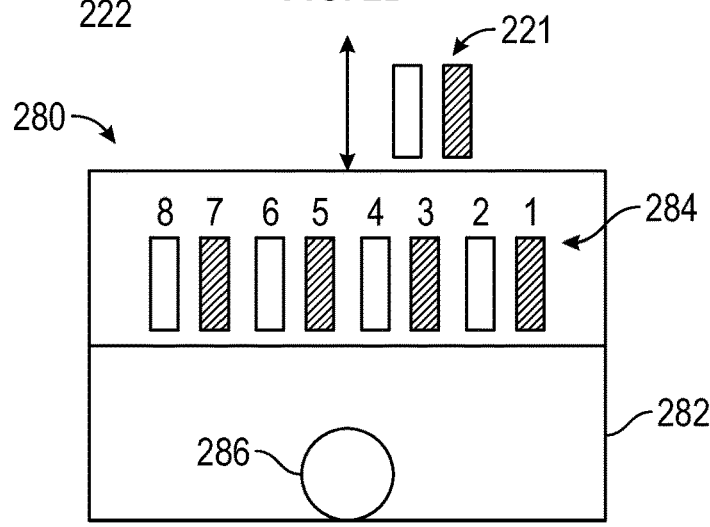
FIG. 2E illustrates, in schematic format, a component of the DWDM system described in FIG. 2A, including an aggrandizer terminal with layer 2 switching.

Finally, with reference to FIG. 2E of the DRAWINGS, there is shown another aggrandizer terminal and repeater, generally designated by the reference numeral 260, which may transmit up to 100 Gigabit/second repeater, according to a high and low channel 221. As shown, the Aggrandizer 202 supplies the aforementioned 100 Gigabit/second capability to the terminal 260, but in the embodiment there is Layer-2 switching installed, permitting 100 or 10 Gigabit capacity on respective channels, generally designated by the reference numeral 282. To respective external devices connected thereto. As depicted, a number of signal wavelengths may be employed to differentiate the channels, such as the signals 1-8, generally designated by the reference numeral 284, to respective end users or terminals using a smart circulator, generally designated by the reference numeral 286, to accomplish same, as described in more detail hereinabove.

As shown in the multiple embodiments depicted, DWDM multiplex configurations with compatible single optical span wavelength intelligent circulators operating in C-Band networked to interfaces of DWDM C-band programmed ROADM and TOADM, with further illustration of full high and low band amplifiers operating at rates of 10 Gbits channels networked into DWDM Multiplex following path onto Aggrandizer One Strand transport single fiber facility coupled through C-band circulators carrying eight low and eight high band channels over major backbone trunks. Furthermore, the embodiments of FIGS. 2A-2E depict several methods used in DWDM networking; Add-Drop channels, Pre-Booster and Post Boosters are configurable in this graphic illustration with various payload capacities being demonstrated. It is a purpose of the instant invention to illustrate the capacities, the small light haul links and other major backbone links with maximum throughput data, all utilizing the single fiber strand concept for transmission in two-way transmission.

With reference again to the embodiments shown in FIGS. 2A-2E, the Aggrandizer equipped Reconfigurable Optical Add/drop Multiplexer called ROADM in 202 set forth in this application, as structured in the various configurations, demonstrate savings realized by networking one fiber strand in and out of several networking locations herein, e.g., assigning four low band and four high band DWDM lambda waves for transporting standard DWDM compatible wavelength signals in the form of Ethernet/IP data carried at high speed of 10 Gbit/s to 100 Gbit/s across single strand of fiber, while networking with the ROADM 202 and, for example, interfacing to the aforementioned Aggrandizer Multiplex terminal 220, where a single fiber strand transports DWDM wavelengths transport and transmits Ethernet data signals over the single fiber, generally designated by the reference numeral 201, using separate assigned DWDM waves, for example, separated from the transported signal waves #1 through #8 lambda signals identified, such as shown by 284, sent in opposite direction.

It should be understood that in the embodiments herein, DWDM lambda signals may be broadband where each wave represents a 10 Gigabit or the 100 Gigabit ITU standard frame made up of 4 each independent 25 Gbit per a single 100 Ghz DWDM channel networked over single strand having the Ethernet/IP multiplexed through passive DWDM multiplex channels 202 and positions each of these two wavelengths at different lambda DWDM wavelengths, such as shown in FIG. 2B. As shown, one DWDM wavelength in high band references a single full two way data channel operates on DWDM high band for transmit while the receive DWDM channel data operates in low bands.

In the Aggrandizer configuration pursuant to a preferred embodiment of the present invention, there are eight wavelengths used in low band 1530 nanometer wave and eight wavelengths in high band 1550 nm nanometer, and each of the sixteen total wavelengths are capable of networking 100 Gigabits or greater times sixteen channels or 160 Gigabits per each low and high band multiplex. It should be understood that black color wavelengths illustrated herein are high band, and the white/grey color wavelengths are low band, with eight additional 100 Gigabit/s low band wavelength data. Additionally, more economically software programmable circulators, e.g., circulator 226, are used to manage and direct specific signals over routes combining the transmit white/grey illustrated pulse containing signals transmitted from the opposite end; A end transmitting to Z end DWDM Multiplex and Z end transmitting to A end on the white/grey wavelength of 1530 nm. The opposite payload data direction would transport Ethernet/IP signals in opposite directions using the aforementioned black wavelength of 1550 nm on single fiber strand, demonstrating the value savings of one fiber strand.

With further reference to FIGS. 2A-2E of the DRAWINGS, the same DWDM reformatting of standard signal arrangements have been modified to transition the two signals onto a single fiber strand by changing the IEEE/ITU standard signal directions and routing the connectivity of DWDM broadband signals across different wavelengths, a practice not found in DWDM long haul channels in systems operating at 10 Gigabits and >100 Gigabits bandwidths. These DWDM waves have ranges up to 80 kilometers between repeater regenerations. Programmable circulators, such as the circulator 226, are networked in the DWDM Metro and long haul facility, and are turned in C band to pass any one or several waves without causing interferences or mixing of wavelengths and these circulators are tunable to the desired "C" band wave as a bandpass filter to ensure the correct DWDM signals are placed in the correct direction of transmission.

It should be understood that the present invention allows the application of standard DWDM equipment and multiplex equipment networked with the Aggrandizer 202 without the need to make modifications to a manufacturers' IEEE or ITU standard DWDM hardware or software designs. Furthermore, it should be understood that illustrated in FIGS. 2A-2E are various systems featuring various benefits of operating over a single fiber strand designed in Aggrandizer networks. The present invention offers means to save one fiber strand on each transport DWDM system, especially in long haul systems where high bandwidth and long paired fiber span systems are operating, particularly in fiber distances reaching upwards of 80 or more kilometers. Although covered in forgoing figures, the splitting of signals into different wavelengths adds a level of security to network firewalls.

Figure 3:
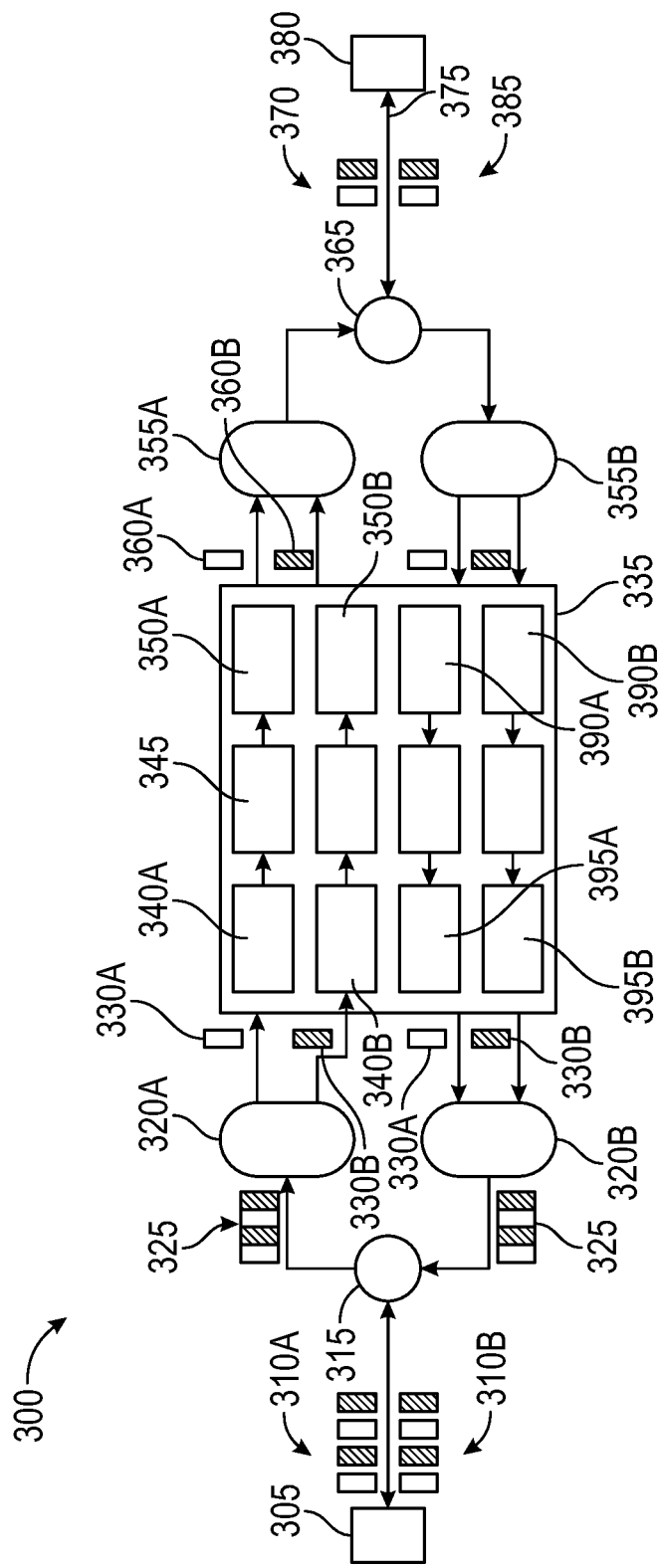
FIG. 3 illustrates a second representative embodiment view of an aggrandizer terminal repeater, in which the multiple wavelengths are routed into respective receivers and transmitters having different wavelengths that do not mix and together when providing gain for different system wavelengths, according to another embodiment of the present invention.

With reference now to FIG. 3 of the DRAWINGS, there is shown a second representative embodiment view of an aggrandizer terminal repeater pursuant to the teachings of the instant invention, generally designated by the reference numeral 300. As shown, multiple wavelengths are routed into respective receivers and transmitters having differing wavelengths, with no interference when providing gain at different wavelengths, and by spacing several lambda's apart eliminating adjacent channel crosstalk and adjacent channel wavelength interference.

In one embodiment of the present invention, both High Band and Low band wavelength signals enter the left data warehouse cross-connect point, generally designated by the reference numeral 305, forming a path for low band and high band channels, generally designated by the reference numerals 310A and 310B, with 310A representing the receipt of signals and 310B representing the transmission of signals. It should be understood that the signals 310A are made of a low band and a high band signal for two channels, shown as four receivers in the figures. Similarly, the signals 310b are a low band and a high hand signal for two channels, shown as four transmitters in the figures.

For the received signals from point 305, these enter a smart circulator, generally designated by the reference numeral 315, which distributes the various incoming signals intelligently, here, as the arrow indicates, to a DWDM multiplexer, generally designated by the reference numeral 320, pursuant to a filter, generally designated by the reference numeral 325. The signals are processed by the multiplexer 320A pursuant to whether the signal is a low pass signal, generally designated by the reference numeral 330A, or a high pass signal, generally designated by the reference numeral 330B. If the signal is a low band signal, it enters a regenerator, generally designated by the reference numeral 335, at the low band receiver, generally designated by the reference numeral 340A. Likewise, if the signal is a high band signal, it enters a the high band receiver, generally designated by the reference numeral 340B.

Thus, the signals enter the wavelength-tuned channel regenerator 335, where like channels in high and low bands are input to low-high RX channels 340A and 340B, and the signals passed on for applicable laser photonic amplification and dejitter performed in respective amplifiers, generally designated by the reference identifiers 345A and 345B, where the wavelength signal levels are boosted to levels of plus 3.5 dB, which is sufficient to reach the 80 km range. The boosted signals are then transmitted via respective transmitters, generally designated by the reference identifiers, 350A and 350B, and the signals then exit the regenerator 335 and pass to another DWDM multiplexer, generally designated by the reference identifier 355A, which receives both the low band and the high band signals, and processes them using filters, for example, a low band filter 36A and a high band filter 360B. The multiplexed and filtered signals then pass through a smart circulator, generally designated by the reference numeral 365, and transmitted via a transmitter, generally designated by the reference numeral 370, onto a single strand wire, generally designated by the reference numeral 375, for transmission to another terminal or repeater, as is understood in the art.

With reference again to FIG. 3, upon receiving a signal from the aforementioned point 305, the signal enters as RX-1 and RX-2, as two independent DWDM signals on low band wavelengths 1530 nm standard of DWDM wavelengths directed into input over a single fiber strand to junction with the aforementioned circulator 315 where a specific wavelength is directed through intelligent managed circulator terminal. Similarly, upon receipt of DWDM inputs that are passive high 1550 nm signals and low 1530 nm, these signals are de-multiplexed 320, and the signal passes into the aforementioned RX signal high gain 340B of signal regenerator 335, de-jittered 345B, and again passes into signal booster 350B thereafter. A laser transmitter 350A/350B then transmits low 1530 nm and high 1550 nm wavelengths into the DWDM multiplexer filter 355A, high/low and on into the aforementioned circulator 365, and outputs the high and low signals TX combined 370 and separated by different wavelengths 1530 nm and 1550 nm. As shown, the signals are placed onto a single fiber strand directed to a distant end station or signal booster 380, perhaps to distances of 80 km over the single fiber to other Aggrandizer equipment.

Now turning to signals from the shared single fiber 375 from the opposite end, i.e., from, distant equipment 380, a path for the receipt of low band and high band channels are also shown, generally designated by the reference numeral 385. The received signals are then passed to the circulator 365, which receives the inputs of high band low band receive signals, and passes these respective 1530 nm and 1550 nm signals over the single fiber to a DWDM multiplexer 355B, wherein signals are separated apart by specific tuned wavelengths and input into the aforementioned regenerator 355. The low band signals enter the regenerator 335 to a low band receiver 390A, and high band signals enter a high band receiver 390B, as illustrated, and amplified for receiver gain of each signal, by passing through respective amplifiers 345 for de-jittering. The signals then pass through a clocking circuit into the high signal transmitters 395A and 395B for the requisite TX-low and TX-high bandwidth signals. The signals then exit the regenerator 335, and enter a DWDM multiplexer 320B, and passed through a transport output DWDM wavelengths, the aforementioned 325, on the single fiber span, passing into a leg of the circulator 315 through channels 310B for a programmable selected bandwidth directed onto the single fiber strand and transmitted, perhaps to distances greater than 80 kilometers along a single fiber strand to data warehouse or DWDM multiplex or an interfacing router having the same Aggrandizer networking compatibility.

Figure 4:
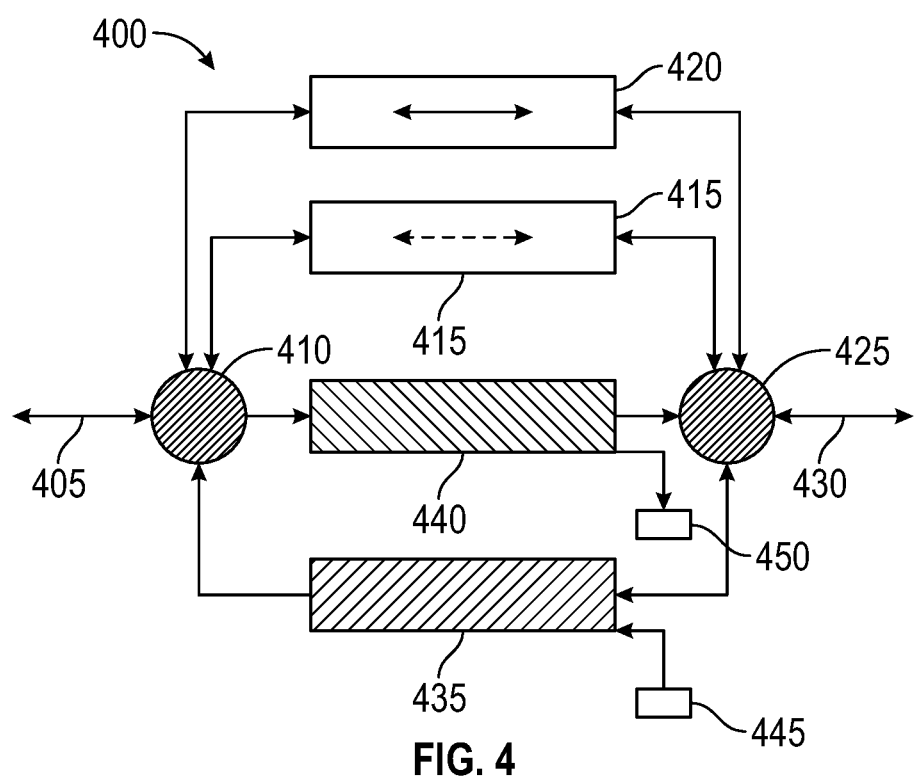
FIG. 4 shows a third representative embodiment view of an aggrandizer drop and insert high speed 10 Gigabit channels with optional repeater bypass of multiple wavelengths being routed into one fiber strand receivers and transmitters having differing wavelengths that do not mix and together when providing optional gain or no gain for different wavelengths.

With reference now to FIG. 4 of the DRAWINGS, there is shown a representative view of an Aggrandizer configuration with a single optical fiber span 401, for connection to a distant device. It should be understood that the signal, interchanged along the fiber 405, preferably includes signals at wavelengths including 1530 nm and 1550 nm. It should also be understood that although these wavelengths are preferred in this embodiment, different wavelengths are possible as is understood to those of skill in the art. The signals then enter a smart wavelength circulator 410 operating in C-Band networked to interfaces of DWDM C-band Tunable Optical Add/Drop Multiplexer (TOADM) devices with illustration of full low and high band passed amplifiers 415 and 420, respectively, corresponding to the aforementioned wavelengths 1530 nm and 1550 nm, operating at rates of 10 Gbits channels. The signals are then sent to another circulator 425, and networked onto the Aggrandizer one strand transport single fiber facility of the present invention, generally designated by the reference numeral 430. It should also be understood that C-band circulators 410 and 425 preferably carry eight low and eight high band channels. As should be understood, Add-Drop channels, Pre-Booster and Post Boosters are optionally configured form use in devices corresponding to this illustration.

With reference again to FIG. 4, there is further shown an exemplary representation of an embodiment view of Aggrandizer drop and insert high bandwidth of 10 Gigabit to >100 Gigabit payloads, where two or more DWDM channels operating in bandwidths of 100 Gigahertz bandpass receive input from the aforementioned single fiber strand 405, and the provided wavelength channels enter the unit over single fiber as high and low bandpass groups and input to the aforementioned Aggrandizer bandwidth managed circulator 410 configured to receive selectable DWDM nanometer wavelengths, and directing the selected wavelengths into the input of the aforementioned tunable optical add/drop TOADM multiplexer, particularly, 1550 nanometer link, generally designated by the reference numeral 435, and a TOADM 1530 nanometer link 440, where each TOADM is software programmed to drop or insert certain pre-planned DWDM channel selections on terminals, with an insert for TOADM 435 at 1550 nm, generally designated by the reference numeral 445, 409 and a drop for TAODM 440 at 1530 nm, generally designated by the reference numeral 450.

As illustrated, the Aggrandizer Gigabit Drop and Insert device 400 operates to combine channels by-passed in circulator 410 and circulator 425, wherein the bypassed channels in the C-Band are routed to the aforementioned bypass filters 415 and 420 that shape the DWDM wavelengths and band limit any undesirable non-desired sidebands arriving at the 1530 nm and 1550 nm channel band-passes, respectively, and having passed through the 1530 nm bandpass filter 415 and the 1550 bandpass filter 420 are directed to the aforementioned circulator 425 to be combined with payload and interfaced onto one the aforementioned single fiber strand 430, particularly, an interface thereof for transmission.

Figure 5:
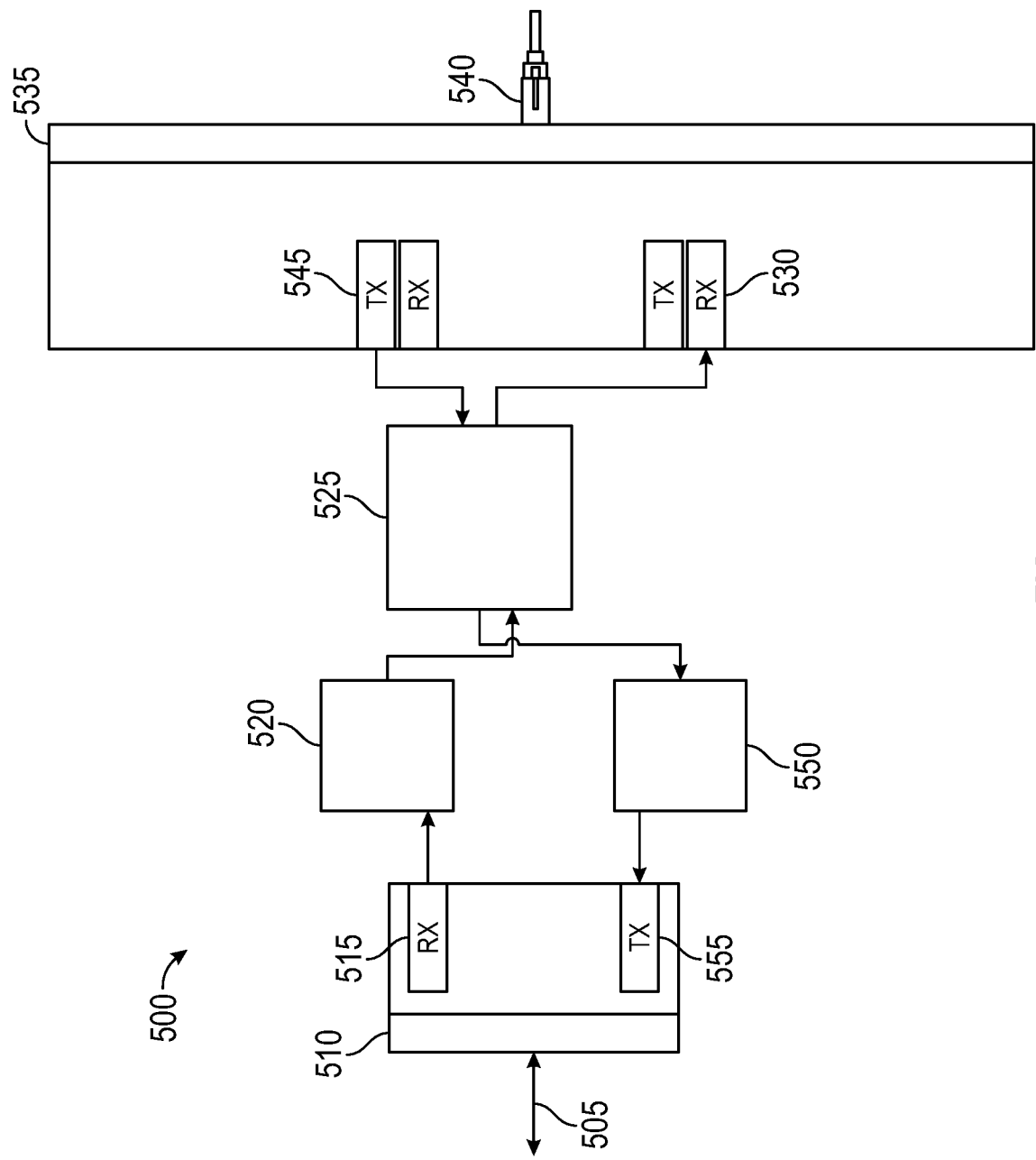
FIG. 5 shows a fourth representative embodiment view of aggrandizer layer 2-3 switch in which the multiple wavelengths are routed into respective receivers and transmitters having differing wavelengths that do not mix and together when providing switching and routing for different wavelength paths onto a single aggrandizer one fiber path system transmitted at the A end transmission system.

With reference now to FIG. 5 of the DRAWINGS, there is shown therein a fourth representative embodiment view of an aggrandizer layer-2-3 switch pursuant to the teachings of the present invention, generally designated by the reference numeral 500, in which multiple wavelengths are routed into respective receivers and transmitters having incongruent wavelengths do not mix and together when providing networking and routing across different wavelength paths onto a single aggrandizer one fiber path system. A transmitted wavelength signal from the A end premise transmission system, such as on strand 405 in FIG. 4, is received at strand 430 and sent out to the Z premise end, as also shown and further described in connection with FIG. 6. It should be understood that the aforementioned drop and insert circuits 450 and 445 shown and described in connection with FIG. 4 can be selected drop out and insert input, one single 10 Gbit signal channel or multiples of 10 Gbit channels.

Now with particular reference to FIG. 5, there is illustrated therein a representation of a one fiber strand interface compatible with the industries layer-2, 3 and above Ethernet stack protocol switches operates these with no conversion or modifications to software, hardware and overall remote management systems. As shown, a one strand fiber 503 connects to and from a backbone, e.g., an 80 km fiber route, as described hereinabove. A DWDM wave combiner, preferably under microprocessor control, selects and processes tunable signal interfaces of standard DWDM channels 510, and signals are selected and passed to a receiver 515, wherein the DWDM input signals from the strand 505 are directed to a DWDM multiplexer 520, with an input of industry standard of 10 Gigabits, 100 Gigabits and higher bandwidths. The signals are then amplified in an amplifier, having an 80 km or greater range high gain DWDM receiver with specific DWDM tuned wavelength of 1530 nm or 1550 nm, depending upon matching opposite channel transmitting output. The signal then passes to a converter 525, and passes to a receiver port or interface, generally designated by the reference numeral 530. It should be understood that the input signals from the converter 525 shows the conversion of input circuit from SFP+ long haul receiver to short range 1310 nm signal operating at lower gain and being isolated from the one fiber line 505, preferably, the signals from the converter 525 are directed into an input of a second 1310 nm interface inserted in a switch receive 1 or 10 or 100 Gigabit port, delivering 10 to 100 Gigabits input to a switch or router.

Further expanding upon benefits of networking the Aggrandizer 500, specifically the 10/100 Gigabit converter 525 with switches and routers, in normal practice a switch would normally require 80 km long haul SFP+ optics be inserted directly into an SFP+ compatible port or interface 530, requiring networks of two outside plant fiber strands for long haul or metro fiber pair connections. The signals pass through the port 530 and through a switch matrix 535, and on to the aforementioned copper connection, generally designated by the reference numeral 540. In adapting one fiber applications, however, the switch uses a more economical 1310 nm SFP+ interface, and is equipped in a transmission switch port 545, whereby, 10 Gigabit/s or 100 Gigabit/s signals are in the opposite direction input to the converter 525, and equipped with laser SFP+ long range optic amplifiers, with the transmit signals being converted in the converter 525 from light to electric. The signals pass through a multiplexer 550, which enhances or improves clock jitter, and converted to light. In other words, the output signal at high level dB level sent to DWDM channel matching multiplexer 540 and the light outputs at the specific selected wavelength, sending the signal into a DWDM wave combiner and output transmitted, generally designated by the reference numeral 555, some 80 km along the single one fiber span. This demonstrates use of one fiber operating with standard Ethernet and IP switching hardware equipment and routers without having to engage expensive redesign to convert deployed equipment for one fiber strand operation. Additionally, the aggrandizer switch 500 is able to handle various payloads being networked therethrough, with no limits upon the one fiber strand interface or transmission along the short to long range fiber spans.

Figure 6:
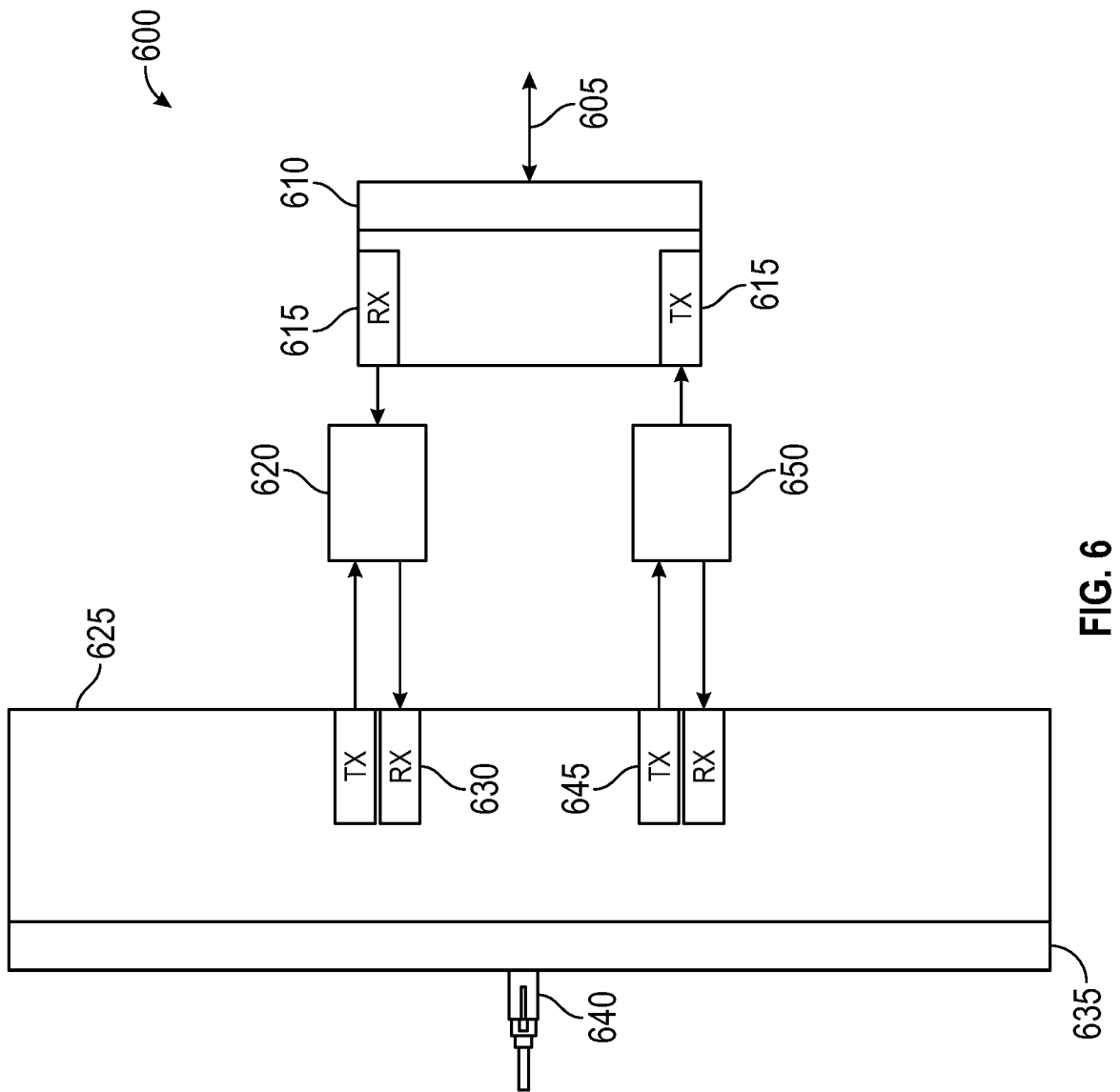
FIG. 6 shows a fifth representative embodiment view of aggrandizer layer 2-3 switch pursuant to the teachings of the present invention.

With reference now to FIG. 6 of the DRAWINGS, there is shown a fourth representative embodiment view of aggrandizer layer-2-3 switch being the "Z" matching end of Aggrandizer Switch, in which the multiple wavelengths are routed into respective receivers and transmitters having incongruent wavelengths sent out from A site Aggrandizer Switch do not mix and together when providing networking and routing across different wavelength paths onto a single aggrandizer one fiber path system. The transmitted A wavelength signal from the A end premise transmission system is received at Z and sent out to the Z premise end. User drop and insert circuits G and Y can be selected to drop out and insert input, one single 100 Mbits, to 1.0 Gigabits signal extension off the low speed side of multiples of low speed channels. The Layer-2 switch 600 functions normally in all area except for the added 10 Gigabit ports being dual transmit SFP+ optical transmitters or receivers. Conventional two fiber strands cabling between the layer-2 switch 10 Gig ports and the DWDM channels are dual distinct wavelengths which are named yellow or green to illustrate the different wavelengths.

The Aggrandizer ports serve upper and lower wavelength channels and network wavelengths onto one single fiber strand. The single fiber strands transports payloads of data in form of full two-way traffic of transmit and receive wavelengths reaching lengths of 80 km range where the low level lightwave signal will be boosted by an optical amplifier or terminated into a SFP+ transmission and receive wave device.

Further referencing FIG. 6, there is shown a representative embodiment 600 view of aggrandizer layer 2-3 switch being the distant matching end of Aggrandizer internetworking with industry IP and Ethernet switches. It should be understood that a single fiber 605 represents the remote interfacing switch includes the single fiber attachment spanning from the corresponding structure in FIG. 5, specifically interfaced to fiber 505, sending and receiving DWDM wavelengths transmitted and received by the switch embodiment 600, interfacing a single fiber strand transporting DWDM waves input to a multiplexer 610, then to a tuned wave combiner 615, a software managed selectable band pass stage, where a signal operating in predetermined bandwidth is allowed to pass though the DWDM channel processor and a multiplexer 620 to an input switch 625, networked so that the switch 625 is activated in standard form. Every type interface compatible with Ethernet and IP may be interfaced to the one fiber Aggrandizer network 600. The input switch 625 is a receive port 630, and the signal passing therethrough enters a switch matrix 635, and then on to the aforementioned copper connector 640. The signal then passes. Transmission output from the copper connector 640, passes through the switch matrix 635, through an output port 645 of the switch 625 The signal the passes through DWDM channel bandpass multiplexer 650 and to the wave combiner 615, and to the multiplexer 610, where transmit and receive signals are combined into the one fiber interface and transmitted across the single fiber 605.

Figure 7A:
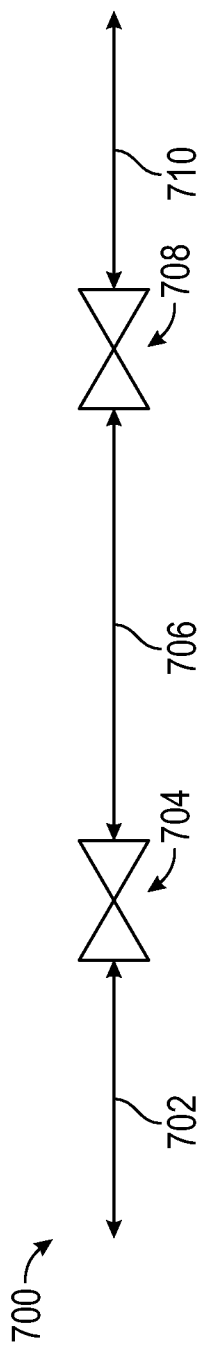
FIGS. 7A-7C illustrates the employment of signal amplifiers to boost the signal content over large distance pursuant to a representative seventh embodiment of the present invention.
Figure 7B:
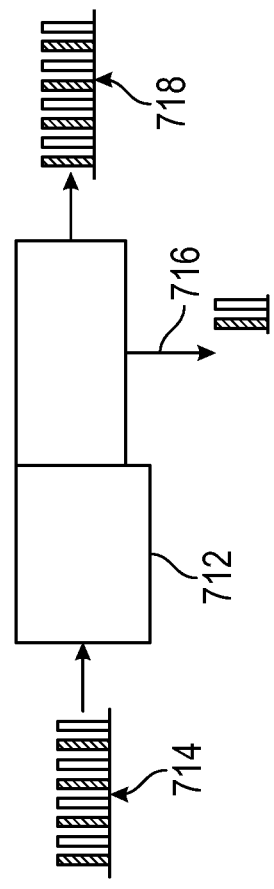
Figure 7C:
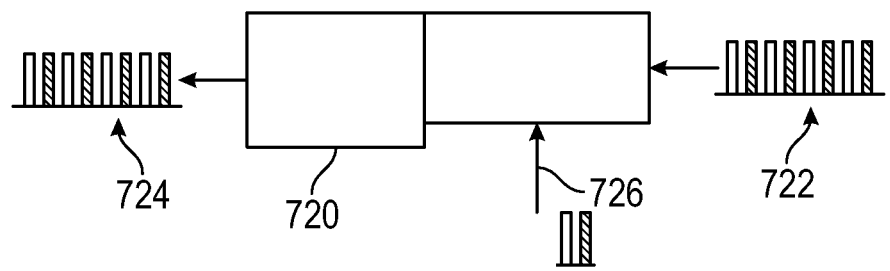

Turning now to FIGS. 7A, 7B and 7C of the DRAWINGS, including the components thereof, there are shown representative views of another Aggrandizer configuration networking a 100Base to a 10G transceiver with technology of single optical span wavelengths "C" Band Dense Wave Division Multiplex (DWDM) operating at specific tuned low power output signal short haul interfaces for driving DWDM C-band ROADM and TOADM ports of 10 G signals, with illustration of wavelengths for full high and low band pre-booster and post-booster amplifiers operating at rates of 100 Megabits to 10 Gbits channels networked over long lengths of single strand fiber where lower fiber signals are input into full high and low band pre-booster and post-booster amplifiers at the Z premise end of the network.

Also shown is a three-port Tunable Optical DWDM Add-and-Drop TOADM device that supports a multi-protocol for high capacity optical transport solutions, such as with the Aggrandizer one-fiber-strand interfaces. The TOADM is tunable across the C-band wavelengths listed under the IEEE and ITU grid standards and accommodates small to large payloads.

Now with particular reference to FIG. 7A of the DRAWINGS, this figure illustrates the use of Erbium doped fiber amplifiers (EDFA) lightwave power amplifiers, generally designated by the reference numeral 704, that when placed at strategic locations can provide lambda amplifier sources required along long fiber spans, generally designated by the reference numeral 702. It should be understood that these amplifiers 704 give a boost to attenuated lambda weak signals along the span 702 even after operating many kilometers. The EDFAs 704 thus output extend the cable span further, sending a lambda driven signal over new spans, generally designated by the reference numeral 706, of the aforementioned one fiber networks to another, remote EDFA amplifier, generally designated by the reference numeral 708, where the signal is once again boosted, as described. The light-driven signal, such as from the A end along the cable span 702, with boosters 704 and 708 and the like, can thus extend this light signal over another long range one strand fiber, generally designated by the reference numeral 710, to further remote locations at terminal Z networks. It should be understood that such booster amplifier locations may also be equipped with tunable optical add/drop multiplex to add and remove DWDM lambda sources transporting intelligent data content e.g., as described and illustrated in FIGS. 7B and 7C, described further hereinbelow.

With reference now to FIG. 7B of the DRAWINGS, there is illustrated therein a preferred embodiment of the present invention, a Tunable Optical Add/Drop Multiplex (TOADM) three port multiplex application, generally designated by the reference numeral 712, that accepts DWDM wavelength signals in the form of C-Band 100 GHz bandwidth channels, generally designated by the reference numeral 714, and electronically under the aforementioned microprocessor management, selecting one or several selectable wavelengths therefrom containing user intelligent data at the input terminal and drops those signals out to a local path, generally designated by the reference numeral 716, i.e., the selected DWDM 10 Gigabit to 100 Gigabit/s lightwave signals. The remaining DWDM wavelengths, generally designated by the reference numeral 718, however, pass through for transmission at other desired destinations, as is understood in the art.

With reference now to FIG. 7C of the DRAWINGS, there is illustrated another embodiment of a Tunable Optical Add/Drop Multiplex (TOADM) three port multiplex application, generally designated by the reference numeral 720, that also accepts DWDM wavelength signals in the form of C-Band 100 GHz bandwidth channels, generally designated by the reference numeral 722, and electronically under the aforementioned microprocessor management, selects one or several selectable wavelengths, generally designated by the reference numeral 726, containing user intelligent data and sends said signal to an input terminal, and adds these wavelengths 726 from a local path for inclusion with the aforesaid input DWDM 10 Gigabit to 100 Gigabit/s lightwave signals 722. The input DWDM wavelengths 722, with the added wavelengths 726, forming a combined output signal, generally designated by the reference numeral 724, proceed through the TOADM 720 for transmission to other desired destinations, as is understood in the art.

Figure 8:
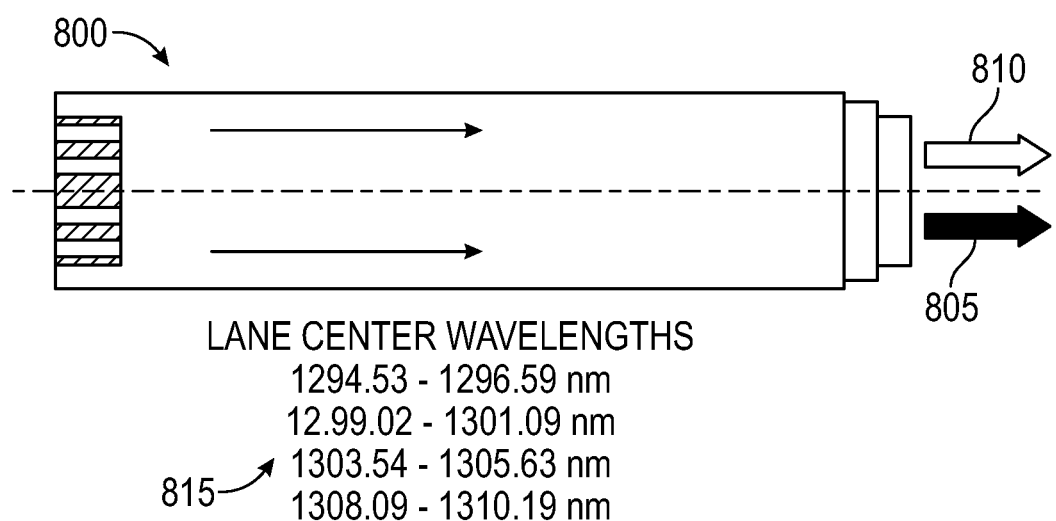
FIG. 8 shows another representative SFP+ embodiment view of aggrandizer optical module in which two separate C-band transmit wavelengths with routed output into a single encasement for transmit to respective receivers having differing wavelengths that do not mix and together when providing laser driver signals at different wavelengths.

With reference now to FIG. 8 of the DRAWINGS, there is illustrated an improved transceiver device, generally designated by the reference numeral 800, pursuant to the paradigm of the present invention. As shown, the transceiver 800 is equipped with two distinct Transmit output lambda sources, one high band and one low band wavelengths within some small form factor pluggable (SPF+) embodiments, generally designated by the reference numerals 805 and 810, respectively. Pursuant to the teachings of the present invention, there is a new design change in transceiver technology. In particular, the new transceiver 800 forms a full one-way dual optical span wavelengths in C Band Dense Wave Division operating across the full C-Band and each SPF+ embodiment, having two specifically different tuned low and high bands transmitters. The transceiver 800 also has low power output signals provisioned for short haul interfaces driving DWDM C-band ROADM and TOADM port 10 G signals, with two discrete output wavelengths for full high and low band amplifiers operating at rates of 10 Gbits channels networked into two interface ports receiving receiver signals from routers, terminals, switches or optical line amplifiers.

Also illustrated in FIG. 8 are 10 km range dual high and low wavelengths one-way signal transmitter in a form fit SFP+ mechanically compatible SFP+ equipped with two distinct Transmit output, lambdas, one a high band and one a low band 810 DWDM C-Band optical laser transmitters, which are inside one apparatus used for short haul ROADM and TOADM applications requiring short haul fiber span, with a range of wavelengths 815, for each illustrated C-band waves. Also shown is a pluggable electrical interface, generally designated by the reference numeral 820, at the other end of the device 800, allowing ease of connectability, as is understood in the art.

Figure 9A:
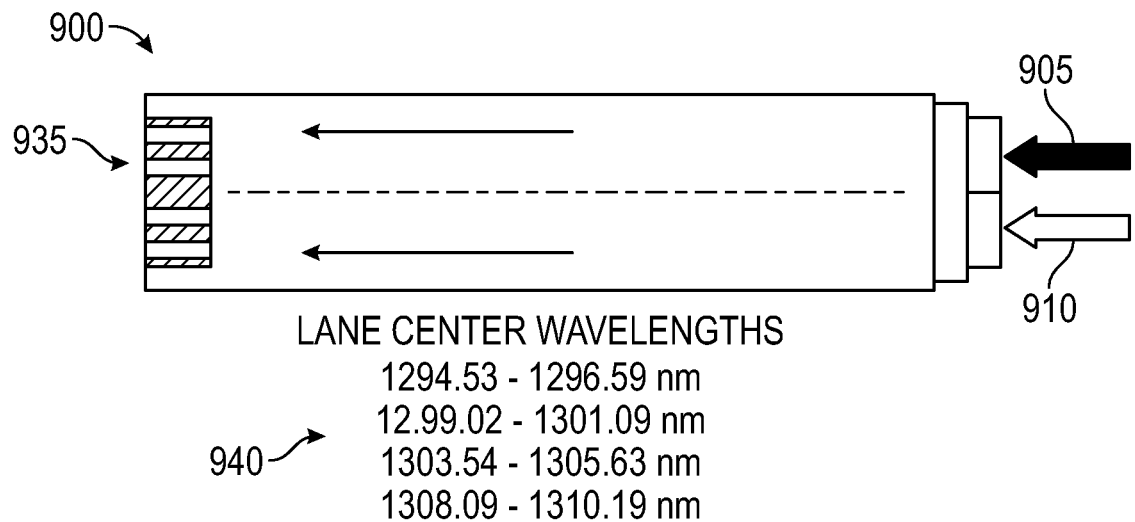
FIGS. 9A and 9B show a ninth representative SFP+ embodiment view of aggrandizer optical module in which two separate C-band receiver wavelengths inputs are routed into a single encasement for input of respective receivers having differing wavelengths that do not mix and together when providing laser signals receiver gain at different wavelengths.
Figure 9B:
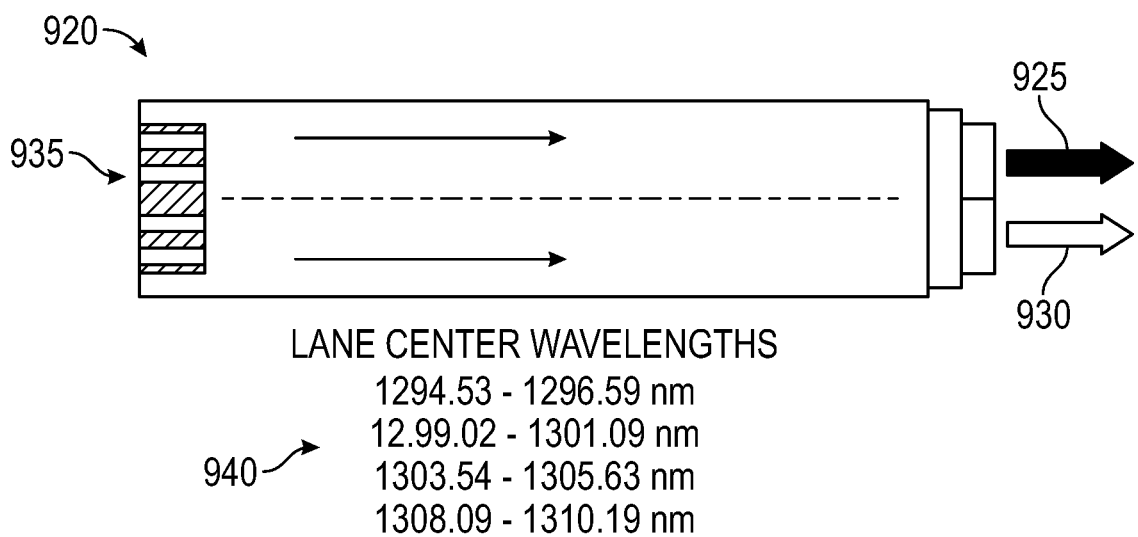

With reference now to FIG. 9 of the DRAWINGS, particularly FIGS. 9A and 9B, there is shown a third representative embodiment view of Aggrandizer layer 2-3>switch being the "A" or "Z" matching end of Aggrandizer Switch, generally designated by the reference numeral 900, in which the multiple wavelengths are routed into respective optical amplifiers with receivers and transmitters having distinct wavelengths sent out from A site Aggrandizer switch that do not mix and together providing networking and routing across different wavelength paths onto a single Aggrandizer one fiber path system. The transmitted (1530 nm band) wavelength signal from the "A" end premise transmission system is received as (1530 nm band) and sent input to the Z premise end of this FIG. 9.

The user drop and insert circuits (IP Data) and (CAT-5) can be selected to drop out and insert input in normal switch and router sequences, one single 100 Mbits to 1.0 Gbits signal extensions off the low speed side of multiple channels. The Layer-2 switch functions normally in all areas except for 10 Gigabit ports being dual transmit SFP+ optical transmitters and dual receivers. Conventional two fiber strand cabling between the layer-2 switch 10 Gig ports and the DWDM channels operating on two separate wavelengths which are identified (yellow or green) as 1550 nm or 1530 nm band-pass illustrates the different wavelengths.

Further referencing FIG. 9A, the 10 km receiver 900 is preferably a form fit SFP+ mechanically compatible SFP+ and is equipped with two distinct receiver input lambdas, one a high band 905 and one a low band 910, two DWDM C-Band optical laser signal receivers inside one apparatus used for short haul ROADM and TOADM applications requiring short haul fiber spans, with receiver short range wavelengths for each of the C-band waves. It should be understood that the Aggrandizer interface would be compatible, e.g., at the electrical interface shown in FIG. 8, where other conventional SFP's and SFP+ optics provide full two-way duplex interfaces operating with only one DWDM wavelength.

Further referencing FIG. 9B, the transmitter shown therein, generally designated by the reference numeral 920, is a transmitter equipped with two transmitter outputs, lambdas, one for high band 925 and one for low band 930.

It should be understood that the Aggrandizer ports for upper and lower channels amplify the separation of wavelengths onto one single fiber strand. The single fiber strand transports payloads of data in form of full two-way traffic or transmit and receive wavelengths reaching lengths of 80 km range where the low level light wave signal will be boosted by an optical amplifier or terminated into lower powered SFP+ transmission and receive wave device interfacing with the switch. Both receiver 900 and the transmitter 920 have a pluggable electrical interface, generally designated by the reference numeral 935, and both have a range of operable wavelengths, generally designated by the reference numeral 940.

Figure 10:
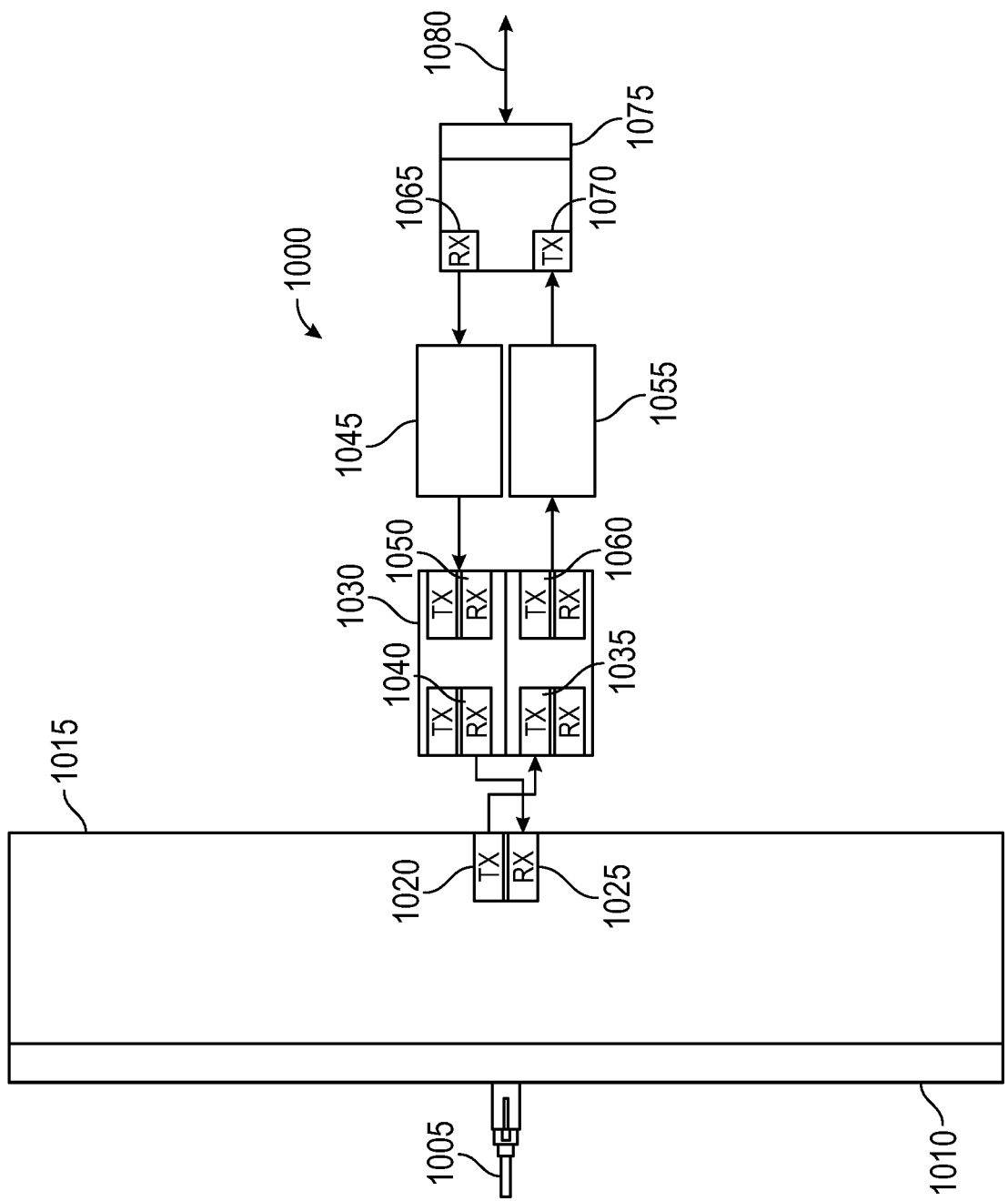
FIG. 10 shows a further embodiment and representative layer 2-3 switch and router with external optical gain repeater aggrandizer optical module in which two separate C-band receiver and transmitter wavelengths are input into a single encasement for input and output of respective transmitters and receivers having differing wavelengths that do not mix and together when providing laser signals gain at different wavelengths.

With reference now to FIG. 10 of the DRAWINGS, the Aggrandizer transport system, generally designated by the reference numeral 1000, depicts a cooper connector, generally designated by the reference numeral 1005, for electrical connectivity, as described hereinabove. The incoming electrical signals pass through a switch matrix, generally designated by the reference numeral 1010, and into a switch, generally designated by the reference numeral 1015, which has two way switch or router ports therein, generally designated by the reference numerals 1020 and 1025, respectively, equipped with full duplex TX and RX SFP+ interfaces where the aforementioned TX port 1020 connects with an amplifier 1030, having a TX port 1035, and the aforementioned RX port 1025 connects with an RX port 1040, ports which are adapted through the aforementioned Aggrandizer shown in FIGS. 8 and 9 and described further hereinabove, and the optics forming high and low C-Band DWDM optical paths to improve connectivity efficiency and limit fiber optic patch cabling configurations. A receiving multiplexer 1045 connects to an RX port 1050 and an aggrandizer 1055 connects to a TX port 1060. Lambda lightwave transporting DWDM format data adapts to conventional industry switches and routers giving these devices an economical boost with the single fiber transport system.

It should be understood that an Aggrandizer equipped Reconfigurable Optical Add/drop device is preferably structured to be Dynamically configurable to process and network wavelengths of different configurations, contents and speeds such as 50 Gbit/s and several grouped bandwidths signals, each transporting wavelengths separated apart and transporting upwards to an 100 Gbit/s input and dropped out or inserted into a Network B, which network across lightwave devices to a Network C, again delivering 50 Gbit/s or 100 Gbit/s in the form of lightwaves, all networking at lambda signal levels presents a further savings realized by networking one fiber strand in and out of several devices found in long haul transport and metro DWDM networks.

Preferably, the application of eight such 100 Gbit/s channels which follow the ITU and with introduction of coherent techniques such as dual polarization quadrature phase shift keying (DP-QPSK) enables an Aggrandizer to transport 50 GHz channels carrying 100 Gbit/s data content which conform the ITU standard which allows the use of IEEE/ITU 50 GHz and 100 GHz channel compatible network data bandwidths to be transmitted and received over the Aggrandizer-managed system. This serves to meet the demand for lower transport cost by raising the bandwidth from 40, 100 and 200 Gigabit channels networked in channels of 100 GHZ multiplex channel per fiber pair and upwards to 96 channels using 50 GHz DWDM channels, which more than doubles the transport capacity over one fiber pair. Aggrandizers thus operating over one fiber strand will multiply this loading factor by two times the aggregate rate per each assigned fiber strand.

It should be understood that the present invention has many facets, many of which have been discussed at length hereinabove. Additional facets are discussed hereinbelow. The Aggrandizer preferably includes: a change in order of assignments, lambda signal wavelength selections, paths and purpose of use of IEEE-ITU standard Dense Wave Division Multiplexing [DWDM] wavelengths and cause said changed wavelengths selected to execute synchronously, a transmit OUTPUT lambda signal with content and receive INPUT lambda signals containing transmit and receive user payload content, all accomplished over standard Native Ethernet framed data and IP Data formatted to form a serial data string and transporting payloads per two directions of transmission.

By way of definitions, Site designations include "A" site applying changed wavelength with content payload transmits the content to "Z" end site receiving said wavelength with content payload for distribution, and "Z" site applying changed wavelength with content payload transmits content to "A" end site receiving said wavelength with content payload.

The present invention includes the scenario where the transmit payload content is networked onto a separate DWDM wavelength from the corresponding receive payload content adds physical and electrical and light wave separation apart from interferences.

The present invention includes the scenario where the aforedescribed optical system further comprises a second light wave path can have full payload diversity over a single strand of fiber operating dual fiber wavelengths A to Z and Z to A ends using separate lambda's.

The present invention includes the scenario where the aforedescribed optical system uses conforming DWDM wavelength assignments per IEEE and ITU international standards allows the Aggrandizer One Fiber to be deployed worldwide in domestic and international markets.

The present invention includes the scenario where the aforedescribed optical system uses conforming DWDM wavelength assignments per IEEE and ITU international standards allows the Aggrandizer One Fiber to be deployed using industry standard EDFA optical amplifiers on long haul networks configured for one fiber transmission in full-two-way payload delivery.

The present invention includes the scenario where the aforedescribed optical system uses standard DWDM wavelength assignments per IEEE and ITU international standards allows the Aggrandizer One Fiber to be deployed using any wideband multi-rates 10 Gig, 40 Gig, 100 Gig and 200 Gig optical transport solution with advantage of operating over Aggrandizer One Fiber networks in metropolitan and long haul networks.

The present invention includes the scenario where the aforedescribed optical system uses standard DWDM wavelength assignments per IEEE and ITU international standards allows the Aggrandizer One Fiber to be deployed and operated on any single mode fiber strand adds savings to fifty percent more payload capacity to existing fiber cable networks.

The present invention includes the scenario where the aforedescribed optical system uses standard DWDM wavelength assignments per IEEE and ITU international standards allows the Aggrandizer One Fiber deployed defer new fiber cable builds and provides relief of congested or filled fiber strands.

The present invention includes the scenario where the aforedescribed optical system uses standard DWDM wavelength assignments per IEEE and ITU international standards allows the Aggrandizer One Fiber to be deployed using any wideband multi-rates of 10 Gig, 40 Gig, 100 Gig and 200 Gig optical transport solution with drop out and insert of full two-way payloads delivering standard IEEE and ITU standard interfaces and compatible data rates.

The present invention includes the scenario where the aforedescribed optical system uses standard DWDM wavelength assignments per IEEE and ITU international standards allows the Aggrandizer One Fiber to be deployed using modified short haul 10 Gig optic modules.

The present invention includes the scenario where the aforedescribed optical system uses standard DWDM wavelength assignments per IEEE and ITU international standards allows the Aggrandizer One Fiber to be deployed using compatible 80 km range 10 Gig SFP+ optical interface module.

The present invention includes the scenario where the aforedescribed optical system uses standard DWDM wavelength assignments per IEEE and ITU international standards allows the Aggrandizer One Fiber to be deployed using OSPF+ 40 Gig bandwidths for interfacing client equipment.

The present invention includes the scenario where the aforedescribed optical system uses standard DWDM wavelength assignments per IEEE and ITU international standards allows the Aggrandizer One Fiber to be deployed using single mode fiber in metropolitan and long haul networks to offset costs of one fiber strand by one half the cost of dual fiber strand costs.

The present invention includes the scenario where the aforedescribed optical system uses standard DWDM wavelength assignments per IEEE and ITU international standards allows the Aggrandizer One Fiber to be deployed using combinations of IEEE standard CWDM bands with DWDM C-band waves.

The present invention includes the scenario where the aforedescribed optical system uses standard DWDM wavelength assignments per IEEE and ITU international standards allows the Aggrandizer One Fiber to be deployed using hardware redundancy and power diversity.

The present invention includes the scenario where the aforedescribed optical system uses standard DWDM wavelength assignments per IEEE and ITU international standards allows the Aggrandizer One Fiber to be deployed using lateral or ring fiber network designs.

The present invention includes the scenario where the aforedescribed optical system uses standard DWDM wavelength assignments per IEEE and ITU international standards allows the Aggrandizer One Fiber to be deployed using optical couplers, splitters and said devices operating on either or both ends of a network.

The present invention includes the scenario where the aforedescribed optical system uses standard DWDM wavelength assignments per IEEE and ITU international standards allows the Aggrandizer One Fiber to be deployed using ROADM optical switching operating at 10 Gig, 40 Gig, 100 Gig and 200 Gig payload wavelengths.

The present invention includes the scenario where the aforedescribed optical system uses standard DWDM wavelength assignments per IEEE and ITU international standards allows the Aggrandizer One Fiber to be deployed using layer-2, 3 and above switching networks and routers.

The present invention includes the scenario where the aforedescribed optical system uses standard DWDM wavelength assignments per IEEE and ITU international standards allows the Aggrandizer One Fiber to be deployed using single mode fiber cross-connects in data centers across worldwide interconnections.

While the present invention has been illustrated by the description of the embodiments thereof, and while the embodiments have been described in detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the breadth or scope of the applicant's concept. Furthermore, although the present invention has been described in connection with a number of exemplary embodiments and implementations, the present invention is not so limited but rather covers various modifications and equivalent arrangements, which fall within the purview of the appended claims.

What claimed is:

1. A communication system for transmitting data bidirectionally across a single fiber strand, comprising:
    a fiber strand;
    a first signal injector at one end of said fiber strand; and
    a second signal injector at the other end of said fiber strand;
    wherein data signals at a first Dense Wave Division Multiplexing (DWDM) wavelength are injected by said first signal injector at said one end of said fiber strand,
    wherein data signals at a second DWDM wavelength are injected by said second signal injector at said other end of said fiber strand,
    wherein said first and second wavelengths differ, and
    wherein said data signals are in C-band wavelengths and under at least one SFP+ protocol, whereby the data signals injected at said first end and the data signals injected at said second end traverse said fiber strand, and whereby said fiber strand is bidirectional.

2. The communication system according to claim 1, wherein said data signals adhere to an industry standard, said industry standard comprising an IEEE/ITU standard.

3. The communication system according to claim 2, wherein said data signals employ at least one layer protocol, said layer protocol consisting of the set comprising Layer-2, Layer-3, Layer-4 and combinations thereof.

4. The communication system according to claim 1, further comprising:

at least one amplifier, said at least one amplifier conjoining two said fiber strands, and boosting the signal being transmitting therethrough.

5. The communication system according to claim 4, wherein said at least one amplifier is an Erbium-doped fiber amplifier.

6. The communication system for transmitting bidirectional data according to claim 1, wherein said fiber strand is operable over a range of data transmission rates.

7. The communication system for transmitting bidirectional data according to claim 6, wherein said data transmission rates are selected from the group consisting of 10 Gigabits/s, 40 Gigabits/s, 50 Gigabits/s, 100 Gigabits/s, and 200 Gigabits/s.

8. A fiber strand comprising:

a first port at one end thereof, said first port configured to receive first data signals at a first Dense Wave Division Multiplexing (DWDM) wavelength; and a second port at the other end thereof, said second port configured to receive second DWDM data signals therein at a second wavelength, wherein said first and said second wavelengths differ, and wherein said data signals are in C-band wavelengths and under at least one SFP+ protocol, whereby data signals injected at said first end and the data signals injected at said second end traverse said bidirectional fiber strand, and whereby said fiber stand is bidirectional.

9. The fiber strand according to claim 8, wherein said fiber strand is operable over a range of data transmission rates.

10. The fiber strand according to claim 9, wherein said data transmission rates are selected from the group consisting of 10 Gigabits/s, 40 Gigabits/s, 50 Gigabits/s, 100 Gigabits/s, and 200 Gigabits/s.

11. The fiber strand according to claim 8, wherein said wherein said data signals adhere to an industry standard, said industry standard comprising an IEEE/ITU standard.

12. The fiber strand according to claim 8, further comprising:

at least one amplifier, said at least one amplifier conjoining two said fiber strands, and boosting the signal being transmitting therethrough.

13. The fiber strand according to claim 12, wherein said at least one amplifier is an Erbium-doped fiber amplifier.

14. A method for transmitting signals across a common fiber strand bidirectionally, comprising:

injecting, at one end of a fiber strand, a first data signal at a first Dense Wave Division Multiplexing (DWDM) wavelength; and injecting, at the other end of said fiber strand at substantially the same time as said injecting at said one end, a second data signal at a second DWDM wavelength, wherein said first and second DWDM wavelengths differ, and wherein said data signals are in C-band wavelengths and under at least one SFP+ protocol, whereby the first and second data signals traverse said bidirectional fiber strand, and whereby said fiber strand is bidirectional.

15. The method for transmitting signals across a common fiber strand bidirectionally according to claim 14, wherein said data signals adhere to an industry standard, said industry standard comprising an IEEE/ITU standard.

16. The method for transmitting signals across a common fiber strand bidirectionally according to claim 15, wherein said data signals employ at least one layer protocol, said layer protocol consisting of the set comprising Layer-2, Layer-3, Layer-4 and combinations thereof.

17. The method for transmitting signals across a common fiber strand bidirectionally according to claim 14, further comprising:

amplifying at least one amplifier, said at least one amplifier conjoining two said fiber strands, and boosting the signal being transmitting therethrough.

18. The method for transmitting signals across a common fiber strand bidirectionally according to claim 17, wherein said at least one amplifier is an Erbium-doped fiber amplifier.

19. The method for transmitting signals across a common fiber strand bidirectionally according to claim 14, wherein said bidirectional fiber strand is operable over a range of data transmission rates.

20. The method for transmitting signals across a common fiber strand bidirectionally according to claim 19, wherein said data transmission rates are selected from the group consisting of 10 Gigabits/s, 40 Gigabits/s, 50 Gigabits/s, 100 Gigabits/s, and 200 Gigabits/s.

\* \* \* \* \*